(12) United States Patent
Matyska et al.

(10) Patent No.: US 11,599,524 B2
(45) Date of Patent: *Mar. 7, 2023

(54) ANOMALY DETECTION

(71) Applicant: KBC Groep NV, Brussels (BE)

(72) Inventors: Tomáš Matyska, Prague (CZ); Eugen Stripling, Löhne (DE); Barak Chizi, Woluwe (BE)

(73) Assignee: KBC Groep NV, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/474,812

(22) Filed: Sep. 14, 2021

(65) Prior Publication Data

US 2022/0050820 A1 Feb. 17, 2022

Related U.S. Application Data

(63) Continuation of application No. 16/643,056, filed as application No. PCT/EP2018/073481 on Aug. 31, 2018, now Pat. No. 11,194,787.

(30) Foreign Application Priority Data

Aug. 31, 2017 (EP) .................................... 17188880

(51) Int. Cl.
  *G06F 16/23* (2019.01)
  *G06N 20/00* (2019.01)
  (Continued)

(52) U.S. Cl.
  CPC ...... *G06F 16/2365* (2019.01); *G06F 16/2379* (2019.01); *G06F 16/278* (2019.01); *G06N 20/00* (2019.01); *G06Q 40/08* (2013.01)

(58) Field of Classification Search
  CPC .......................... G06F 16/2365; G06F 16/2379
  See application file for complete search history.

(56) References Cited

U.S. PATENT DOCUMENTS 6,260,036 B1 *  7/2001 Almasi ................. G06F 16/285
                                                    707/693
6,269,375 B1    7/2001 Ruddy et al.
                      (Continued)

FOREIGN PATENT DOCUMENTS

JP   2012208710 A   10/2012
JP   2018207595 A   12/2018
                (Continued)

OTHER PUBLICATIONS

Sun et al., "Detecting Anomalous User Behavior Using an Extended Isolation Forest Algorithm: An Enterprise Case Study", Cryptography and Security, Sep. 21, 2016, 13 pages, arXiv preprint arXiv:1609.06676.

(Continued)

*Primary Examiner* — Vaishali Shah
(74) *Attorney, Agent, or Firm* — Hodgson Russ LLP

(57) ABSTRACT

A database includes a plurality of physical entity records of insurance claims, and each physical entity record includes physical data values for at least one numeric attribute and partition-specifying values concerning values for one or more nominal attributes from one or more insurance claim records. A method for detecting anomalies in the database includes retrieving and partitioning the plurality of physical entity records from the database, training an unsupervised anomaly detection algorithm on the plurality of physical entity records to obtain a trained anomaly detection model for each partition, calculating an anomaly score for each physical entity record using the trained anomaly detection model associated with each partition, and updating the plurality of physical entity records in the database by adding the associated anomaly score. The method is used to determine if a user-provided physical entity record is fraudulent using the anomaly score.

10 Claims, 8 Drawing Sheets

(51) Int. Cl.
*G06F 16/27* (2019.01)
*G06Q 40/08* (2012.01)

(56) References Cited

U.S. PATENT DOCUMENTS

| | | |
|---|---|---|
| 10,045,218 B1 | 8/2018 | Stapleton et al. |
| 2006/0143350 A1 | 6/2006 | Miloushev et al. |
| 2015/0238866 A1* | 8/2015 | Khabazian ............. A63F 13/75 |
| | | 463/7 |
| 2016/0379309 A1 | 12/2016 | Shikhare |
| 2017/0243140 A1 | 8/2017 | Achin et al. |
| 2018/0113899 A1 | 4/2018 | Htun et al. |
| 2019/0340716 A1* | 11/2019 | Cella ................... G06Q 50/184 |

FOREIGN PATENT DOCUMENTS

| | | |
|---|---|---|
| WO | 2007098426 A2 | 8/2007 |
| WO | 2017032775 A1 | 3/2017 |

OTHER PUBLICATIONS

Otey et al., "Fast Distributed Outlier Detection in Mixed-Attribute Data Sets", Data Mining and Knowledge Discovery, Apr. 7, 2006, pp. 203-228, vol. 12, SpringerNature.

Liu et al., "Isolation Forest", Proceedings of Eighth IEEE International Conference on Data Mining, Dec. 19, 2008, pp. 413-422, IEEE.

Kazumi, "Detection of multivariate outliers: Modified Stahel-Donoho estimators", Research Memoir of Official Statistics, Mar. 2010, pp. 89-157, vol. 67, Statistical Research and Training Institute.

* cited by examiner

1. Selection

2. Partitioning

3. Conditional Anomaly Detection

4. Classifier Training

ANOMALY DETECTION

CROSS-REFERENCE TO RELATED APPLICATIONS

The application is a continuation of U.S. application Ser. No. 16/643,056, filed Feb. 28, 2020, which is a national stage entry of International Application No. PCT/EP 2018/073481, filed Aug. 31, 2018, which claims priority to EP Application No. 17188880.3, filed Aug. 31, 2017. The entire disclosures of the above-mentioned applications are incorporated by reference herein.

TECHNICAL FIELD

The invention pertains to the technical field of automatically detecting anomalies through feature engineering.

BACKGROUND

There remains a need in the art for an improved system for automatically detecting anomalies in large data sets.

Related prior art is provided by US 2016/0379309 and WO 2017/032775.

US 2016/0379309 discloses a computer-implemented method and system for detecting possible occurrences of fraud in insurance claim data. Historical claims data is obtained over a period of time for an insurance company. The fraud frequency rate and percentage loss rate for the insurance company are calculated. The fraud frequency rate and percentage loss rate for the insurance company are compared to insurance industry benchmarks for the fraud frequency rate and the percentage loss rate. Based on the comparison to the industry benchmarks, the computer system determines whether to perform predictive modeling analysis if the insurance company is within a first range of the benchmarks, to perform statistical analysis on the claim data if the insurance company is below the first range of the benchmarks or perform forensic analysis if the insurance company is above the first range of the benchmarks. A problem with US 2016/0379309 is that it is overly complex and its use is limited to fraud in insurance claim data.

WO 2017/032775 discloses an event classification that is trained by means of machine learning. To this end, an anomaly detection for detecting events in an image data set is carried out. Based on the performing of the anomaly detection, a model assumption of the event classification is determined. However, WO 2017/032775 is directed to training an event classification and lacks means to improve anomaly detection.

In (M. E. Otey et al., Fast Distributed Outlier Detection in Mixed-Attribute Data Sets, Data Mining and Knowledge Discovery 12 (2-3):203-228, Kluwer Academic Publishers, 2006), Otey and his co-authors disclose related methods and systems for outlier detection.

The present invention aims to resolve at least some of the problems mentioned above.

SUMMARY OF THE INVENTION

In a first aspect, the present invention provides a system for detecting anomalies, said system comprising
a communication module having access to a database comprising a plurality of physical entity records, each physical entity record comprising physical data values for at least one numeric attribute and partition-specifying values concerning values for one or more nominal attributes;
a computing device comprising a processor, tangible non-volatile memory, program code present on said memory for instructing said processor;
wherein the communication module is arranged to provide said computing device access to said database,
wherein said computing device is configured for carrying out a method for calculating an anomaly score for each of said plurality of physical entity records, said method comprising the steps of:
(a) retrieving said plurality of physical entity records via said communication module and optionally preparing said plurality of physical entity records for partitioning;
(b) partitioning said plurality of physical entity records, by associating a partition with each distinct combination of partition-specifying values present in said plurality of physical entity records and grouping said physical entity records according to said partitions;
(c) for each of said partitions obtained in step (b), training an unsupervised anomaly detection algorithm on the physical data values of the physical entity records belonging to said partition, obtaining a trained anomaly detection model for each of said partitions;
(d) for each physical entity record belonging to said plurality of physical entity records, calculating the anomaly score by means of the trained anomaly detection model that is associated with the partition to which the physical entity record belongs;
(e) preferably, via the communication module, updating each physical entity record in the database by adding its associated anomaly score calculated in step (d) and/or preferably, via the communication module, storing each of said trained anomaly detection models for each of said partitions in said database.

A first advantage of such a system lies in that it allows to perform anomaly detection conditionally on reference groups (i.e., partitions) that are meaningful to operators operating the system. Partitions are defined by distinct combinations of values of selected nominal attributes, whereas existing unsupervised anomaly detection techniques neglect nominal attributes. Based on the observation that in many applications, records in general consist of both nominal and numeric attributes, the present invention yields improved accuracy in those cases, by making use of all available information, including the values for one or more nominal attributes. Hence, the resulting anomaly scores are more precise then in a case where anomaly detection is performed without adequately accounting for nominal attributes. This is done in such a way that an unsupervised and hence highly automated algorithm can be used to detect the outliers.

A second advantage of the system is that it allows seamless integration with the application of a supervised classification algorithm, as discussed further in this document.

According to further aspects, the invention provides a method for detecting anomalies and uses of a system for detecting anomalies.

The advantages of the method and the uses are similar to those of the system according the present invention.

Further preferred embodiments and their advantages are discussed in the detailed description and the claims.

DESCRIPTION OF FIGURES

FIG. 1a illustrates a selection step of the method, FIG. 1b illustrates a partitioning step of the method, FIG. 1c illustrates an anomaly detection step of the method, and FIG. 1d illustrates a training step of the method.

FIG. 2a illustrates a two-dimensional graph with six samples, each associated with different values for continuous numeric attributes $X_1$ and $X_2$, in which normal data points are indicated with circles and an anomaly is indicated with a triangle, and FIG. 2b illustrates an iTree procedure which is repeated with a randomly selected attribute and a randomly drawn split value until a stopping condition is reached.

FIG. 3a illustrates a two-dimensional graph of sample data corresponding to height and weight measurements of males and females, FIG. 3b illustrates contour lines corresponding to anomaly scores generated according to a prior art method for the sample data, FIG. 3c illustrates contour lines corresponding to anomaly scores generated according to a method of the present invention for the males of the sample data, and FIG. 3d illustrates contour lines corresponding to anomaly scores generated according to a method of the present invention for the females of the sample data.

DETAILED DESCRIPTION OF THE INVENTION

Figure 1A:
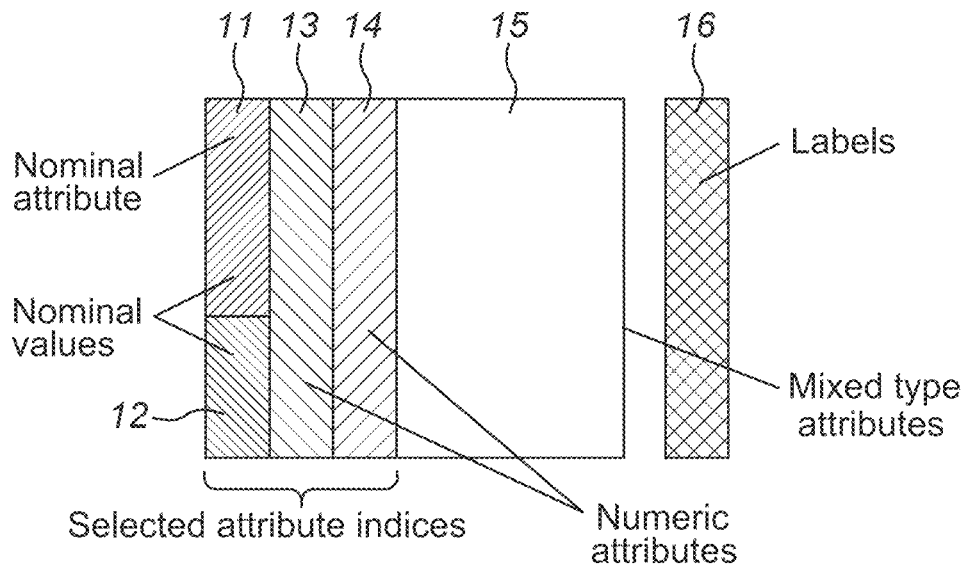
FIGS. 1a to 1d illustrate a method of one embodiment of the present invention, where

The present invention concerns a system and use of said system for detecting anomalies.

In the context of this document, the terms "physical entity record" and "record" are used interchangeably, and refer to data representing a physical entity. The record comprises physical data values for at least one numeric attribute. Furthermore, the record comprises partition-specifying values concerning values for one or more nominal attributes. One example is a record comprising measurements of e.g. location of a physical person, the time spent in a certain state and related data, as can be found e.g. in insurance claim records. Hereby, the time spent may for instance be comprised in the physical data values, whereas categories relating to the claimant, i.e. the person to which the claim applies, may be part of the partition-specifying values. Furthermore, the plurality of physical entity records may be connected by some form of mutual relation. In one embodiment it may be identical measurements relating to a plurality of persons.

In another embodiment, the record concerns an image, e.g. a bitmap comprising an array of pixels. Then, the plurality of records may concern an image data set composed of a time sequence of images and as such constitute a video sequence on which outlier detection is performed. The plurality may alternatively or additionally derive from a plurality of channels from different spectra or different contrast methods. In yet another embodiment, the record may concern another format, such as a sound file or a video file. In another embodiment, the record may be defined as part of an insurance claim, and may for instance concern an image that provides evidence in the context of an insurance claim. In such case, the image may concern or be comprised in the physical data values, whereas the partition-specifying values may concern metadata of the image or information regarding the claimant associated with the claim to which the image belongs.

In this document, the term "fraud" refers to a deliberate deception perpetrated against or by an insurance company or agent for the purpose of financial gain. Fraud can be categorized as "hard" fraud and "soft fraud". Hard fraud occurs when an insurance claim is fabricated or when multiple parties coordinate a complex scheme involving multiple parties such as agents, doctors, attorneys, claimants, and witnesses. Soft fraud occurs when claimant exaggerates the value of a legitimate claim or misrepresents information in an attempt to pay lower policy premiums.

In this document, the term "anomaly detection" refers to a method to learn the characteristics of a given data set in order to be sufficiently capable of distinguishing anomalous data points from normal ones. Generally, anomalies or outliers are considered to be exceptions or peculiarities in the data that do not conform to the normal or expected behavior of the majority. When visualizing the data, anomalies are identified by being relatively small in number and lying apart from the main bulk of data. Note that anomaly detection is related to research fields such as outlier detection and novelty detection, and therefore the application of some detection methods are often found across these fields. In what follows, the discussion is mainly centered around the isolation forest algorithm. Further information on outlier and anomaly detection methods is provided in "Hodge, V. J., & Austin, J. (2004); A Survey of Outlier Detection Methodologies; Artificial Intelligence Review, 22 (2), 85-126" and "Chandola, V., Banerjee, A., & Kumar, V. (2009); Anomaly Detection: A Survey; ACM Computing Surveys (CSUR), 41 (3), 15:1-15:58", below referred to as "Chandola et al. (2009)".

In this document, the term "isolation-based anomaly detection algorithm" is used as umbrella term for techniques such as iForest, SCiForest or iNNE (see below), i.e. algorithms that by means of isolation, are capable of directly modeling anomalies, unlike most other methods that identify anomalies as being deviations from an inferred region representing normal behavior (see also Chandola et al. (2009)).

The isolation forest (iForest) is proposed by Liu et al., in "Liu, F. T., Ting, K. M., & Zhou, Z.-H. (2008); Isolation Forest; In Proceedings of the Eighth IEEE International Conference on Data Mining (ICDM'08) (pp. 413-422)", below referred to as "Liu et al. (2008)". It is a nonparametric anomaly detection method since it does not make any assumptions about the data distribution. Despite the very simple design, the iForest algorithm is very competitive both in detection performance and time efficiency. The creators of iForest showed that their algorithm outperforms several other state-of-the-art anomaly detectors on various real-world data sets. Regarding iForest's scalability, complexity analysis presented in "Liu, F. T., Ting, K. M., & Zhou, Z.-H. (2012); Isolation-Based Anomaly Detection; ACM Transactions on Knowledge Discovery from Data (TKDD), 6 (1), 3:1-3:39", below referred to as Liu et al. (2012), revealed that it has a time complexity of $O(t\psi^2)$ for training and a time complexity of $O(nt\psi)$ for evaluation, which amounts to a total time complexity of $O(t\psi(n+\psi))$, where n denotes the number of instances in the data set. It is important to note that the training complexity does not involve any data-dependent variables, since the training complexity of iForest solely depends on its invariant and known input parameters. The space complexity of the isolation forest equals $O(t\psi)$. To summarize, iForest is a very scalable algorithm, and even when dealing with large data sets, it possesses a low linear time complexity (i.e., $t\psi^2 \ll n$) with a low memory requirement, see Liu et al. (2012).

Furthermore, trees or iTrees play an important role in iForest, which is an unsupervised, tree-based ensemble method that applies the novel concept of isolation to anomaly detection. Isolation refers to the separation of each instance from the rest. By exploiting the basic property of anomalies to be "few and different," the notion of an isolation-based method is that anomalous instances are more easily separable (i.e., require less data partitions) than normal instances. Solely the tree structures of the learned ensemble are required to generate anomaly scores, hence this method avoids calculating computationally expensive distance or density measures. Overall, isolation is a better indicator for anomaly detection than distance and density. That is, normal data points close to the dense anomaly cluster exhibit a larger distance or lower density than the anomalous points, which is the opposite of the desired outcome, whereas isolation-based methods consistently assigned reasonable values to the anomalous and normal points. The base learning algorithm of iForest is called isolation tree (iTree), see also Example 2 and 3 below.

In the context of the training of algorithms, following terms are used. The "training set" is the set of data observations (also called 'examples' or 'instances') that is used to train or to learn the model. An analytical model has parameters that need to be estimated in order to make good predictions. This translates into finding the optimal parameter values for the analytical model. For this reason, we use the training set to find or to estimate the optimal parameter values. Once we have a trained model, we can use it to make predictions. In a supervised classification task, also class labels (e.g., 'fraud', 'no fraud') are attached to each observation to estimate the optimal parameter values. This allows to train the algorithm on patterns that are helpful to identify fraud cases. The "validation set" relates to models with parameters that cannot be estimated directly from the data. Yet, in order to also find optimal values for those parameters (referred to as hyperparameters), the so-called validation set is used. Typically, a set of candidate values for the hyperparameters can be identified. One picks one candidate value, trains the model on the training set, and evaluates the prediction performance on the validation set. Then one picks the next candidate value and proceeds in a similar fashion until all candidate values have been tried out. In the end, for each candidate value a corresponding estimate of the prediction performance is obtained. Based on the performances estimated on the validation set, one can pick the one candidate value that corresponds to the optimal performance. It is important to note that the training set and validation set are strictly separated in the whole process in order to obtain reliable performance estimates. That is, observations in the validation set cannot be in the training set (or test set for that matter). The "test set", also "hold-out sample" is the set of data observations that is used to test whether the trained model makes good predictions. That is, in the model evaluation phase, one knows the true values of the test observations and one may check how many of the predicted values are correct by comparing them to the true values. It is important to note that here the class labels are only used to evaluate the prediction performance (e.g., accuracy) of the classification model. It is also important to note that the training set, validation set, and test set are strictly separated in order to obtain reliable performance estimate. That is, observations in the test set cannot be in the training set or validation set. The strict separation is crucial, because one desired the model to make prediction about observations that have not been used in the training process. Only when this is guaranteed and the model shows a good performance, one can be certain that the model will also perform well on new, previously unseen data. The "holdout strategy" or "single train-test split strategy" refers to the simplest splitting because the data is divided into two sub-sets: one for training and one for testing. One may train the model with the former and then test it with the latter. Note that the train-test process is only done once. This data split is done randomly, i.e. observations are randomly assigned to belong to the training or test set. The performance is evaluated on the test set, usually for a set of candidate models, and the best model is picked. Some models possess parameters that cannot be estimated from the data directly. They are called hyperparameters. One may rely on a validation set to find the best model. Here, one can divide the data into three subsets: one for training, one for validation, and one for testing. The splitting is also done in a random fashion. With the help of the validation set, one can find the model with the optimal hyperparameter values (i.e. a model selection), and the best model is finally evaluated on the test set. Note that the choice for the selection of the best prediction model, amongst a set of various candidate models, is made based on the performance measured on the test set. For example, one may need to decide if the logistic regression model, the decision tree, or the random forest is the best performing model. To make this decision, the performance on the test set is crucial. When the final prediction model is found, it may be put it into practice in the operational system for making predictions for new, previously unseen data. The term 'k-fold cross validation strategy" refers to an alternative to the simple train-test splitting. It corresponds to a repetitive train-test splitting, whereby the test set is shifted systematically. The obtained performances on the test sets are then averaged. The advantage of this strategy is that each observation will be once in the test set. Yet, more importantly, the estimated prediction performance becomes more reliable, which in turn provides a better picture of the generalization performance of the model.

In one embodiment of the invention, the system or the operational system handles records that concern insurance claims. In this context, it is assumed that an insurance company may require said system or said operational system for processing and analysis of data regarding insurance claims and payout of insurance claims. The system and operational system may be multi-layered, wherein data is received from claimants, health care providers, medical professionals, diagnostic persons, as well as, internal processing by members of the insurance company. The data present in the record of the insurance claim typically undergoes processing and analysis with established business rules of the insurance company. In this context, the "user" providing an insurance claim may in one embodiment be the claimant, but may as well be anyone involved in the processing of the claim. The "operator" on the other hand is typically someone from the insurance company, but may also concern a third party responsible for performing fraud detection on insurance claims.

In a first aspect, the present invention provides a system for detecting anomalies, said system comprising
a communication module having access to a database comprising a plurality of physical entity records, each physical entity record comprising physical data values for at least one numeric attribute and partition-specifying values concerning values for one or more nominal attributes;

a computing device comprising a processor, tangible non-volatile memory, program code present on said memory for instructing said processor;

wherein the communication module is arranged to provide said computing device access to said database, wherein said computing device is configured for carrying out a method for calculating an anomaly score for each of said plurality of physical entity records, said method comprising the steps of:

(a) retrieving said plurality of physical entity records via said communication module and optionally preparing said plurality of physical entity records for partitioning;

(b) partitioning said plurality of physical entity records, by associating a partition with each distinct combination of partition-specifying values present in said plurality of physical entity records and grouping said physical entity records according to said partitions;

(c) for each of said partitions obtained in step (b), training an unsupervised anomaly detection algorithm on the physical data values of the physical entity records belonging to said partition, obtaining a trained anomaly detection model for each of said partitions;

(d) for each physical entity record belonging to said plurality of physical entity records, calculating the anomaly score by means of the trained anomaly detection model that is associated with the partition to which the physical entity record belongs;

preferably, via the communication module, updating each physical entity record in the database by adding its associated anomaly score calculated in step (d) and/or preferably, via the communication module, storing each of said trained anomaly detection models for each of said partitions in said database.

The advantage of such a system lies in the full consideration of nominal attributes, as indicated briefly above. As mentioned, in many applications, records in general consist of both nominal and numeric attributes. In fact, many data sets including insurance fraud detection data sets usually consist of both nominal and numeric attributes (Chandola, V., Banerjee, A., & Kumar, V. (2009). Anomaly Detection: A Survey. ACM Computing Surveys (CSUR), 41 (3), 15:1-15:58). As such, the present invention is particularly useful for applications such as insurance fraud detection where nominal attributes are available, using all available information in the anomaly detection.

In a preferred embodiment, said unsupervised anomaly detection algorithm concerns either an isolation-based anomaly detection algorithm such as iForest or SCiForest or iNNE or a non-isolation-based anomaly detection algorithm such as ORCA or local outlier factor, preferably iForest, and said partition-specifying values preferably concern values for two nominal attributes.

An embodiment with iForest as unsupervised anomaly detection algorithm is particularly advantageous because it has been empirically proved (Liu et al. 2008, 2012) that iForest's detection performance, especially when the number of instances is larger than 1,000, is superior to common state-of-the-art anomaly detection algorithms. Moreover, the present invention advantageously combines with iForest, which in itself does not allow the incorporation of nominal attributes. In the system according to the present invention, the information of nominal attributes is meaningfully incorporated, by applying iForest to data records that belong to the same partition, with matching nominal characteristics. This establishes a more homogeneous baseline (i.e., reference group) which in turn leads to "less distorted anomaly scores" (see also Examples).

Since iForest, like many related algorithms, requires all attributes at its input to be numeric, a setup according to the state of the art is to convert nominal attributes to numeric attributes, and feed these converted attributes to the anomaly detection algorithm. Such a setup is found, e.g., in "Sun, L., Versteeg, S., Bortas, S., & Rao, A. (2016); Detecting Anomalous User Behavior Using an Extended Isolation Forest Algorithm: An Enterprise Case Study; CoRR, abs/1609.06676", referred to as "Sun et al. (2016)" below. An advantage of the present invention is that by avoiding the conversion of nominal attributes to numeric attributes, the information present in the data set is taken into account in an undistorted way, leading to superior anomaly detection performance.

While anomaly detection algorithms such as ORCA (a distance-based method, see "Bay, S. D., & Schwabacher, M. (2003); Mining Distance-based Outliers in Near Linear Time with Randomization and a Simple Pruning Rule. In Proceedings of the Ninth ACM SIGKDD International Conference on Knowledge Discovery and Data Mining (pp. 29-38) "), LOF (Local Outlier Factor, a density-based method; see "Breunig, M. M., Kriegel, H.-P., Ng, R. T., & Sander, J. (2000); LOF: Identifying Density-based Local Outliers; In ACM Sigmod Record (Vol. 29, pp. 93-104)."), one-class SVM (Support Vector Machine, a model-based method; see "Scholkopf, B., Platt, J. C., Shawe-Taylor, J. C., Smola, A. J., & Williamson, R. C. (2001); Estimating the Support of a High-Dimensional Distribution; Neural Computation, 13 (7), 1443-1471"), and random forest with proximity matrices (a model-based method; see "Shi, T., & Horvath, S. (2006); Unsupervised Learning With Random Forest Predictors; Journal of Computational and Graphical Statistics, 15 (1), 118-138") can equally be applied in the present invention, iForest outperforms these methods when it comes to detection performance for large number of instances. The iForest algorithm is also able to effectively detect anomalies in high dimensional space, even when anomalous instances were not presented in the training sample. The algorithm is computational very efficient since it does not rely on the calculation of expensive distance or density measures. However, in the presence of local and/or clustered anomalies, anomaly detection capabilities of iForest are less effective in those circumstances. In fact, iForest primarily targets scattered anomalies since the derived anomaly score is computed globally which is not sensitive to the local data distributions. In alternative embodiments, SCiForest (Isolation Forest with Split-selection Criterion; see "Liu, F. T., Ting, K. M., & Zhou, Z.-H. (2010); On Detecting Clustered Anomalies Using SCiForest; In Proceedings of the European Conference on Machine Learning and Principles and Practice of Knowledge Discovery in Databases (ECML PKDD'10) (pp. 274-290)") or iNNE (Isolation using Nearest Neighbour Ensemble; see "Bandaragoda, T. R., Ting, K. M., Albrecht, D., Liu, F. T., & Wells, J. R. (2014); Efficient Anomaly Detection by Isolation Using Nearest Neighbour Ensemble; In Proceedings of the 2014 IEEE International Conference on Data Mining Workshop (ICDMW) (pp. 698-705)") may be applied in the anomaly detection steps (c) and (d), which may complement the adequate and very different approach according to the present invention, wherein a separate partitioning step precedes the application of the unsupervised anomaly detection algorithm.

In another preferred embodiment, wherein said physical data values concern images, wherein said partition-specifying values preferably concern values for nominal attributes stored as metadata with respect to said images such as EXIF information, file dates or file names. The advantage of using metadata such as Exchangeable image file format (EXIF) is that a dataset of images commonly has some metadata available. Very often this metadata is informative of the nature of the data and the grouping of images associated to a certain time of the day, a certain event or a certain place. In an alternative embodiment, the partition-specifying values may be extracted from the pixel information itself, extracting values relating to, e.g., brightness, luminance, contrast, color depth, color spectrum, etc.

According to another embodiment, said plurality of physical entity records is prepared for partitioning in step (a), wherein said preparing comprises updating said plurality of physical entity records, wherein said updating comprises specifying, preferably automatically, which nominal attributes are to be used as partition-specifying values from step (b) onward. This is advantageous since it allows to automatically select nominal attributes in such a fashion that the overall anomaly detection performance is increased. In such a preferred embodiment, the nominal attributes that are useful for specifying partitions may be identified by completing all steps of the method for a hypothetical choice of partition-specifying values and hence generating a "preview" associated with such a choice. The quality of this preview may be assessed either manually by an operator or automatically by means of an objective function. This scheme may be repeated iteratively until the operator is satisfied with the result or some criterion related to the objective function is met, such as attaining a pre-defined threshold that is compared with the output of the objective function. In a related embodiment with similar advantages, said communication module is configured for receiving input from a user; wherein said updating as part of said preparing in step (a) comprises receiving said input from said user via said communication module; and wherein said input from said user comprises said specification of which nominal attributes are to be used as partition-specifying values from step (b) onward.

In a preferred embodiment, said updating of said plurality of physical entity records comprises transforming, preferably automatically, at least one numeric attribute to a newly created nominal attribute; wherein said transforming relates to associating at least one nominal label to at least one numeric interval; and wherein said specification of which nominal attributes are to be used as partition-specifying values from step (b) onward comprises said newly created nominal attribute.

According to another preferred embodiment, said database comprises training data relating to a plurality of training-related physical entity records comprised in said plurality of physical entity records; wherein said training data comprises a plurality of labels indicative of whether said training-related physical entity records adhere to a predefined anomaly-relating criterion such as being fraud-related; and wherein said computing device is configured for carrying out following additional steps (f)-(j) after step (e):

(f) updating each physical entity record by adding its associated anomaly score calculated in step (d);

(g) retrieving said training data via said communication module;

(h) based on said training data received in step (g), training a supervised classification algorithm on the updated physical entity records obtained in step (f), obtaining a trained supervised classification model;

(i) for each physical entity record belonging to said plurality of physical entity records, calculating a prediction score, said prediction score indicative of the extent to which said physical entity record adheres to said predefined anomaly-relating criterion by means of the trained supervised classification model;

(j) preferably, via the communication module, updating each physical entity record in the database by adding its associated prediction score calculated in step (i) and/or preferably, via the communication module, storing said trained supervised classification model in said database.

In another preferred embodiment, for each physical entity record, said updating in step (f) concerns replacing said partition-specifying values with said anomaly score associated with said physical entity record.

Such an embodiment is advantageous in that the anomaly detection now helps to steer the efforts of the supervised classification algorithm toward anomalies. As such, the corresponding system is able to provide a synthesis of knowledge gained from labels, on the one hand, and automatically generated anomaly scores, on the other hand. Typically, the labels may concern manually applied labels assigned by domain experts, as discussed for instance in Example 5 below.

In yet another embodiment, said supervised classification algorithm trained in step (h) and applied in step (i) concerns logistic regression or CART decision tree or random forest or SVM with linear kernel or SVM with radial basis function.

According to yet another embodiment, said training of said supervised classification algorithm in step (h) comprises splitting said training-related physical entity records and associated training data according to any of the following strategies: holdout, k-fold cross-validation.

This is advantageous since it allows superior prediction.

In a second aspect, the present invention provides an operational system for scoring a user-provided physical entity record, said system comprising an operational communication module having access to a database comprising at least one trained anomaly detection model generated by a system according to any of the claims 1-10;

an operational computing device comprising a processor, tangible non-volatile memory, program code present on said memory for instructing said processor;

wherein the operational communication module is arranged to provide said computing device access to said database and is further arranged to receive input from a user;

wherein said operational computing device is configured for carrying out the steps of:

(01) receiving a user-provided physical entity record from said user via said operational communication module, said user-provided physical entity record comprising physical data values for at least one numeric attribute and partition-specifying values concerning values for one or more nominal attributes;

(02) preparing said user-provided physical entity record for scoring, said preparing comprising selecting one or more nominal attributes corresponding to partition-specifying values;

(03) retrieving the trained anomaly detection model that corresponds to the nominal attributes selected in step (02) from said database via said operational communication module;

(04) calculating the anomaly score of said user-provided physical entity record by means of the trained anomaly detection model retrieved in step (03).

In one embodiment, the operational system and the system are comprised in the same super-system, which covers all functionality provided by the system and the operational system. In such a super-system, the communication module and the operational communication module may be one and the same; likewise, the computing device and the operational computing device may be one and the same.

In a preferred embodiment of the operational system according to the present invention, said database further comprises at least one trained supervised classification model generated by a system according to the present invention, wherein said operational computing device is configured for carrying out the additional steps (05)-(07) after step (04):

(05) updating said user-provided physical entity record by adding its associated anomaly score calculated in step (04);
(06) retrieving the trained supervised classification model that corresponds to the nominal attributes selected in step (02) from said database via said communication module;
(07) calculating the prediction score of said user-provided physical entity record by means of the trained supervised classification model retrieved in step (06).

According to another preferred embodiment, said operational communication module is arranged to generate an alert for an operator, preferably a visual or acoustic alert; wherein said operational computing device is configured for comparing the anomaly score calculated in step (04) or the prediction score calculated in step (07); wherein said alert for the operator is generated when said comparison yields that a pre-defined alert value is matched or is exceeded.

In a third aspect, the present invention concerns the use of a system or operational system according to the present invention by an insurance company to detect fraud relating to physical entity records concerning insurance claims.

In a fourth aspect, the present invention provides the use of a trained anomaly detection model or a trained supervised classification model generated by a system according to the present invention to determine whether a user-provided physical entity record concerning an insurance claim is fraudulent.

In various embodiments of the present invention, the training of the supervised classification algorithm allows for higher precision in the classification of records. The supervised learning step capitalizes on the anomaly detection performed in the previous step, thereby achieving a particularly steep learning curve. Such a learning curve corresponds to relatively little effort for manual annotation while attaining high accuracy.

In a further aspect, the present invention provides an operational system for scoring a user-provided physical entity record, said system comprising
an operational communication module having access to a database comprising at least one trained anomaly detection model generated by a system according to any of the claims 1-10;
an operational computing device comprising a processor, tangible non-volatile memory, program code present on said memory for instructing said processor;
wherein the operational communication module is arranged to provide said computing device access to said database and is further arranged to receive input from a user;

wherein said operational computing device is configured for carrying out the steps of:
(01) receiving a user-provided physical entity record from said user via said operational communication module, said user-provided physical entity record comprising physical data values for at least one numeric attribute and partition-specifying values concerning values for one or more nominal attributes;
(02) preparing said user-provided physical entity record for scoring, said preparing comprising selecting one or more nominal attributes corresponding to partition-specifying values;
(03) retrieving the trained anomaly detection model that corresponds to the nominal attributes selected in step (02) from said database via said operational communication module;
(04) calculating the anomaly score of said user-provided physical entity record by means of the trained anomaly detection model retrieved in step (03).

In a further aspect, the present invention concerns the use of a system or operational system according to the present invention by an insurance company to detect fraud relating to physical entity records concerning insurance claims.

In a further aspect, the present invention provides the use of a trained anomaly detection model or a trained supervised classification model generated by a system according to the present invention to determine whether a user-provided physical entity record concerning an insurance claim is fraudulent.

According to a further aspect, which is not intended to limit the scope of the invention in any way, the invention relates to following points 1-15.

1. A system for detecting anomalies, said system comprising
    (a) a communication module having access to a database comprising a plurality of physical entity records, each physical entity record comprising physical data values for at least one numeric attribute and partition-specifying values concerning values for one or more nominal attributes;
    (b) a computing device comprising a processor, tangible non-volatile memory, program code present on said memory for instructing said processor;
    wherein the communication module is arranged to provide said computing device access to said database,
    wherein said computing device is configured for carrying out a method for calculating an anomaly score for each of said plurality of physical entity records, said method comprising the steps of:
    (a) retrieving said plurality of physical entity records via said communication module and optionally preparing said plurality of physical entity records for partitioning;
    (b) partitioning said plurality of physical entity records, by associating a partition with each distinct combination of partition-specifying values present in said plurality of physical entity records and grouping said physical entity records according to said partitions;
    (c) for each of said partitions obtained in step (b), training an unsupervised anomaly detection algorithm on the physical data values of the physical entity records belonging to said partition, obtaining a trained anomaly detection model for each of said partitions;
    (d) for each physical entity record belonging to said plurality of physical entity records, calculating the anomaly score by means of the trained anomaly detection model that is associated with the partition to which the physical entity record belongs;
  (e) preferably, via the communication module, updating each physical entity record in the database by adding its associated anomaly score calculated in step (d) and/or preferably, via the communication module, storing each of said trained anomaly detection models for each of said partitions in said database.
2. The system according to point 1, wherein said unsupervised anomaly detection algorithm concerns either an isolation-based anomaly detection algorithm such as iForest or SCiForest or iNNE or a non-isolation-based anomaly detection algorithm such as ORCA or local outlier factor, preferably iForest, and wherein said partition-specifying values preferably concern values for two nominal attributes.
3. The system according to any of points 1-2, wherein said physical data values concern images, and wherein said partition-specifying values preferably concern values for nominal attributes stored as metadata with respect to said images such as EXIF information, file dates or file names.
4. The system according to any of points 1-3, wherein said plurality of physical entity records is prepared for partitioning in step (a), wherein said preparing comprises updating said plurality of physical entity records, wherein said updating comprises specifying, preferably automatically, which nominal attributes are to be used as partition-specifying values from step (b) onward.
5. The system according to point 4, wherein said communication module is configured for receiving input from a user; wherein said updating as part of said preparing in step (a) comprises receiving said input from said user via said communication module; and wherein said input from said user comprises said specification of which nominal attributes are to be used as partition-specifying values from step (b) onward.
6. The system according to any of points 4-5, wherein said updating of said plurality of physical entity records comprises transforming, preferably automatically, at least one numeric attribute to a newly created nominal attribute; wherein said transforming relates to associating at least one nominal label to at least one numeric interval; and wherein said specification of which nominal attributes are to be used as partition-specifying values from step (b) onward comprises said newly created nominal attribute.
7. The system according to any of points 1-6, wherein said database comprises training data relating to a plurality of training-related physical entity records comprised in said plurality of physical entity records; wherein said training data comprises a plurality of labels indicative of whether said training-related physical entity records adhere to a predefined anomaly-relating criterion such as being fraud-related; and wherein said computing device is configured for carrying out following additional steps (f)-(j) after step (e):
  (f) updating each physical entity record by adding its associated anomaly score calculated in step (d);
  (g) retrieving said training data via said communication module;
  (h) based on said training data received in step (g), training a supervised classification algorithm on the updated physical entity records obtained in step (f), obtaining a trained supervised classification model;
  (i) for each physical entity record belonging to said plurality of physical entity records, calculating a prediction score, said prediction score indicative of the extent to which said physical entity record adheres to said predefined anomaly-relating criterion by means of the trained supervised classification model;
  (j) preferably, via the communication module, updating each physical entity record in the database by adding its associated prediction score calculated in step (i) and/or preferably, via the communication module, storing said trained supervised classification model in said database.
8. The system according to point 7, wherein for each physical entity record, said updating in step (f) concerns replacing said partition-specifying values with said anomaly score associated with said physical entity record.
9. The system according to any of points 7-8, wherein said supervised classification algorithm trained in step (h) and applied in step (i) concerns logistic regression or CART decision tree or random forest or SVM with linear kernel or SVM with radial basis function.
10. The system according to any of points 7-9, wherein said training of said supervised classification algorithm in step (h) comprises splitting said training-related physical entity records and associated training data according to any of the following strategies: holdout, k-fold cross-validation.
11. An operational system for scoring a user-provided physical entity record, said system comprising
  an operational communication module having access to a database comprising at least one trained anomaly detection model generated by a system according to any of the points 1-10;
  an operational computing device comprising a processor, tangible non-volatile memory, program code present on said memory for instructing said processor;
  wherein the operational communication module is arranged to provide said computing device access to said database and is further arranged to receive input from a user;
  wherein said operational computing device is configured for carrying out the steps of:
  (01) receiving a user-provided physical entity record from said user via said operational communication module, said user-provided physical entity record comprising physical data values for at least one numeric attribute and partition-specifying values concerning values for one or more nominal attributes;
  (02) preparing said user-provided physical entity record for scoring, said preparing comprising selecting one or more nominal attributes corresponding to partition-specifying values;
  (03) retrieving the trained anomaly detection model that corresponds to the nominal attributes selected in step (02) from said database via said operational communication module;
  (04) calculating the anomaly score of said user-provided physical entity record by means of the trained anomaly detection model retrieved in step (03).
12. The operational system according to point 11, wherein said database further comprises at least one trained supervised classification model generated by a system according to any of points 7-10, wherein said operational computing device is configured for carrying out the additional steps (05)-(07) after step (04):
  (05) updating said user-provided physical entity record by adding its associated anomaly score calculated in step (04);

(06) retrieving the trained supervised classification model that corresponds to the nominal attributes selected in step (02) from said database via said communication module;

(07) calculating the prediction score of said user-provided physical entity record by means of the trained supervised classification model retrieved in step (06).

13. The operational system according to point 11 or 12, wherein said operational communication module is arranged to generate an alert for an operator, preferably a visual or acoustic alert, and wherein said operational computing device is configured for comparing the anomaly score calculated in step (04) or the prediction score calculated in step (07), wherein said alert for the operator is generated when said comparison yields that a pre-defined alert value is matched or is exceeded.

14. Use of a system or operational system according to any of the points 1-13 by an insurance company to detect fraud relating to physical entity records concerning insurance claims.

15. Use of a trained anomaly detection model or a trained supervised classification model generated by a system according to any of the points 1-10 to determine whether a user-provided physical entity record concerning an insurance claim is fraudulent.

The invention is further described by the following non-limiting examples which further illustrate the invention, and are not intended to, nor should they be interpreted to, limit the scope of the invention.

EXAMPLES

Example 1: Example Operating Principle Present Invention

FIG. 1 illustrates the operating principle of one embodiment of the present invention. The system for detecting anomalies has access to a database comprising a plurality of physical entity records. Each of these records has a structure according to FIG. 1a. Each record comprises multiple mixed type attributes (11, 12, 13, 14, 15), the number of attributes being equal to d, d≥3, whereby j is the index over the attributes. With at least some of the records (the training data, see below), a label (16) is associated that is indicative of a predefined anomaly-relating criterion such as being fraud-related.

FIG. 1a corresponds to a selection step. Of all mixed type attributes (11, 12, 13, 14, 15), at least one nominal and at least one numeric attribute is selected. In this example, of the set of attributes, the first attribute (11, 12) (with index j=1) is selected as nominal attribute for anomaly detection. Hereby, the nominal attribute (11, 12) may take on only two possible, partition-specifying values, i.e. either a first partition-specifying value (11) or a second partition-specifying value (12). The second (13) (with index j=2) and third (14) attribute (with index j=3) are selected from the total set of attributes as first numeric attribute (13) and second numeric attribute (14), respectively. Together, the nominal attribute with its two partition-specifying values (11, 12) and the two numeric attributes (13, 14) of each record are taken as input to the system.

Figure 1B:
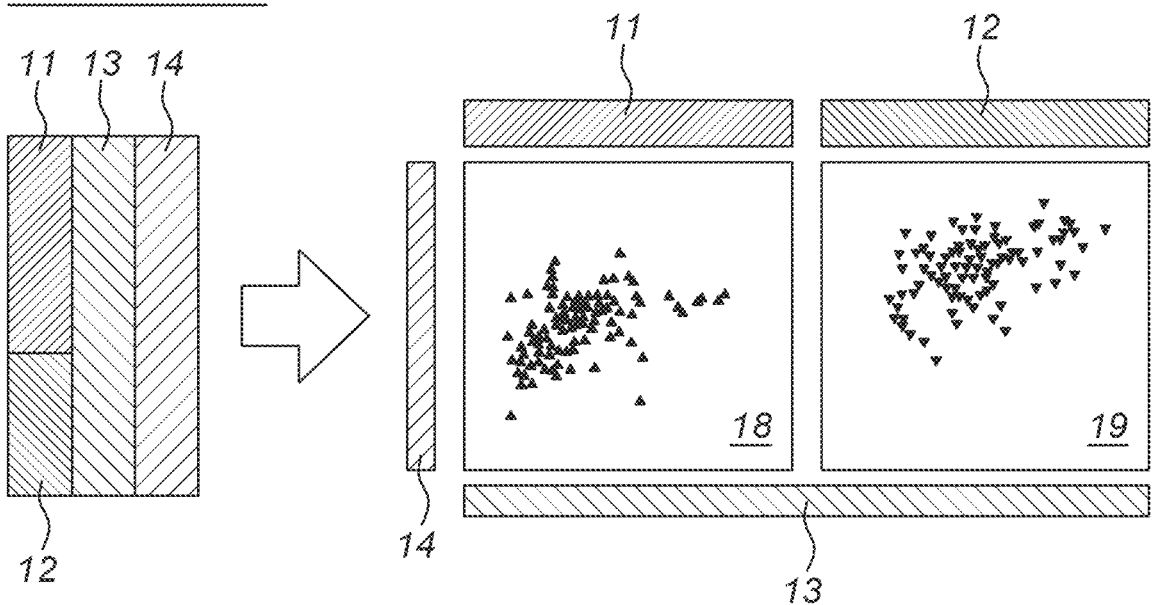

The partitioning step is illustrated in FIG. 1b. With the partition-specifying values (11, 12) as starting point, the plurality of physical entity records is partitioned in two partitions, of which the first partition is associated with the first partition-specifying value (11) and the second partition is associated with the second partition-specifying value (12). For illustrative purposes, in FIG. 1b, for each of both partitions, the data points corresponding to specific combinations of the first (13) and second (14) numeric attribute are set out in a first and a second two-dimensional graph (18, 19), respectively.

Figure 1C:
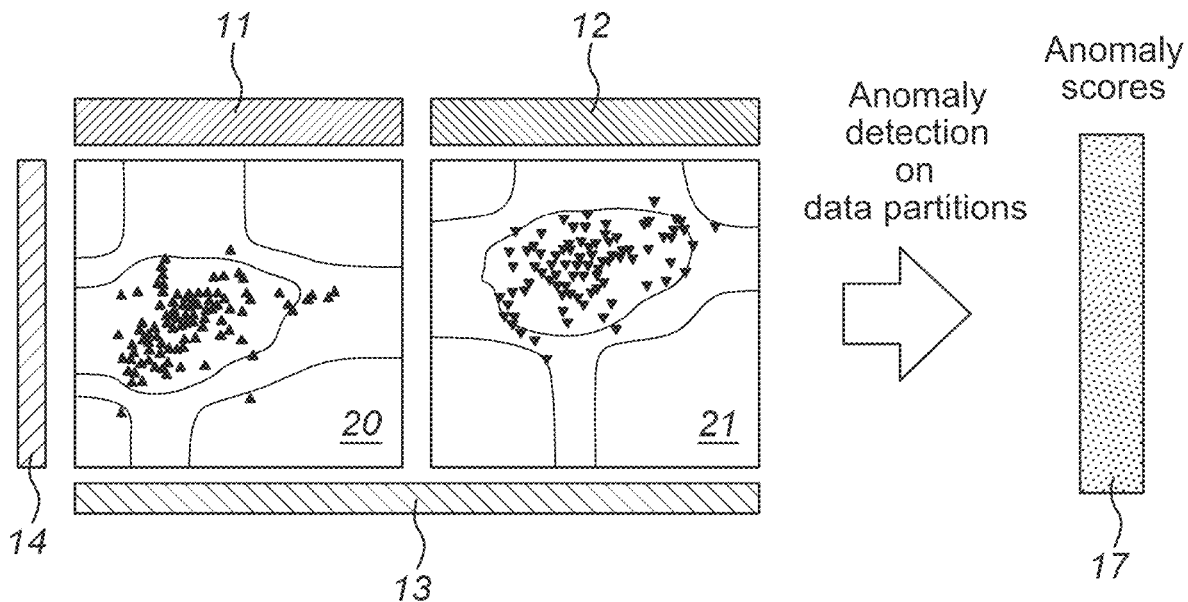

FIG. 1c illustrates the anomaly detection step, wherein anomaly detection is conditioned with respect to the nominal attribute (11, 12). For the first partition-specifying value (11), the unsupervised anomaly detection algorithm is trained on the physical data values of the first and second numeric attribute (13, 14) of each of the records belonging to the first partition. A first trained anomaly detection model is obtained, which is then used to calculate the anomaly score of each of the records belonging to the first partition. Likewise, for the second partition-specifying value (12), the unsupervised anomaly detection algorithm is trained on the physical data values of the first and second numeric attribute (13, 14) of each of the records belonging to the second partition. A second trained anomaly detection model is obtained, which is then used to calculate the anomaly score (17) of each of the records belonging to the second partition. As a result, all records are scored, and each record is updated in the database by adding its associated anomaly score (17). For each of both partitions, the anomaly score (17) may be calculated for each combination of the first (13) and second (14) numeric attribute, as illustrated with a first and a second two-dimensional graph (20, 21), respectively. Hereby, the contour lines join points of equal anomaly score (see also Example 3 and 4). Preferably, the unsupervised anomaly detection algorithm concerns iForest. In this example, the anomaly score is scaled in the range [−0.5,0.5], whereby a score close to the upper bound is regarded as an anomaly.

Figure 1D:
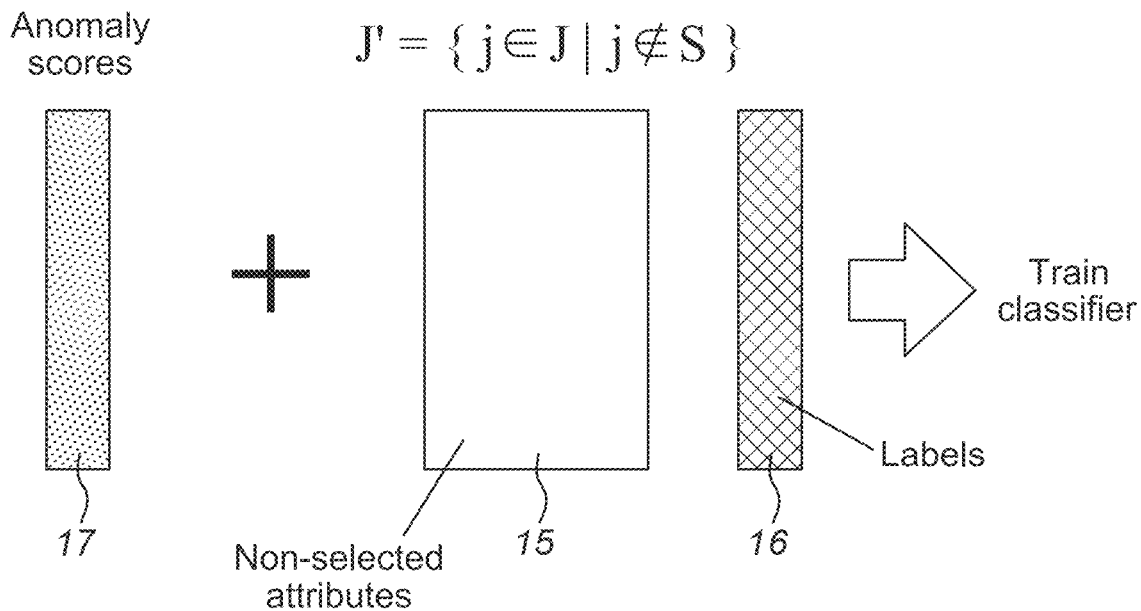

FIG. 1d illustrates a preferred embodiment of the invention, with the further step of training a classification algorithm. In this step, a training set is identified, which comprises a plurality of training-related physical entity records, and is completely contained in the plurality of physical entity records. The training data comprises a plurality of labels (16) indicative of whether said training-related physical entity records adhere to a predefined anomaly-relating criterion such as being fraud-related. The records belonging to the training set are fed together with their labels and the associated anomaly scores to a supervised classification algorithm such as logistic regression. In the preferred embodiment illustrated in FIG. 1d, the nominal attribute (11, 12) and the first and second numeric attribute (13, 14) selected in the first step are not taken along in this step but are replaced entirely by the anomaly scores (17). The non-selected attributes (15), i.e. the attributes that were not selected in the first step, with set of indices Y, are considered. This yields a trained supervised classification model, which is then used to calculate a prediction score for each of the records in the data set. The prediction score is indicative of the extent to which said physical entity record adheres to said predefined anomaly-relating criterion.

Example 2: Example Isolation Tree Application

Figure 2A:
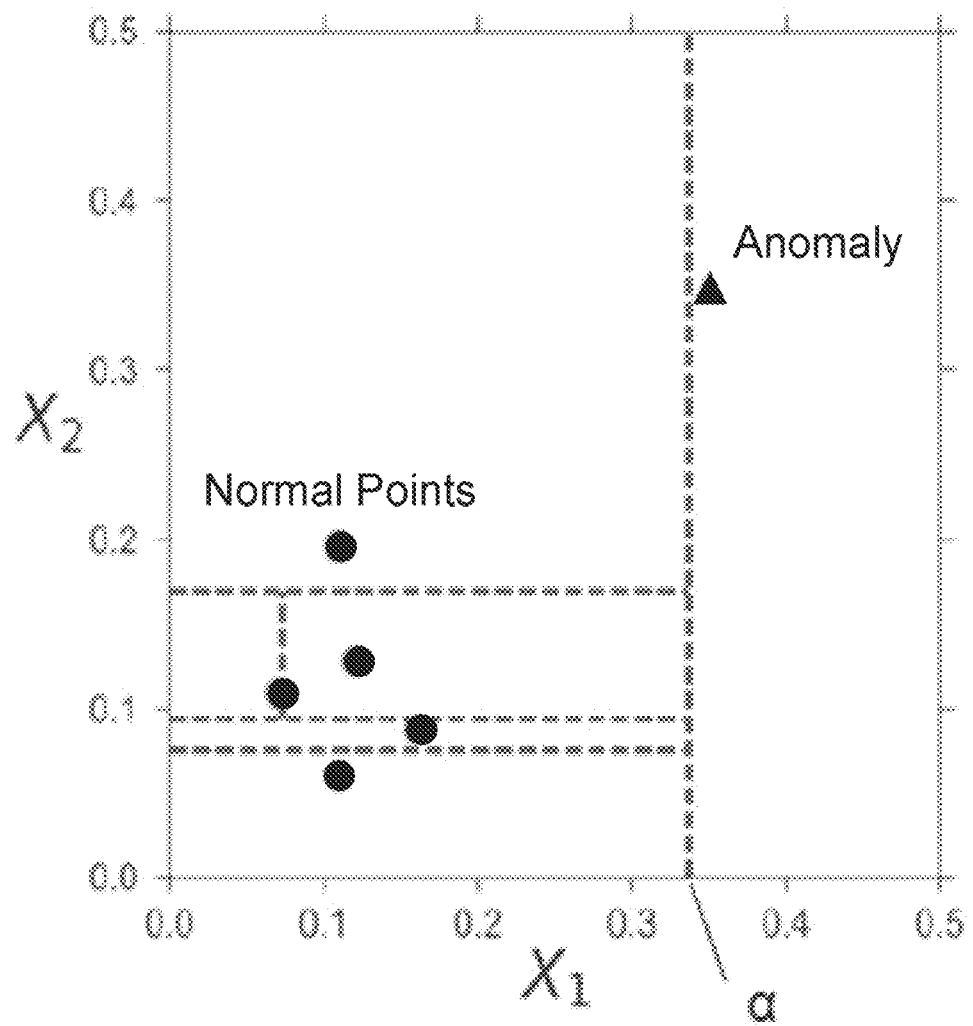
FIGS. 2a and 2b illustrate an example of an isolation tree application, where
Figure 2B:
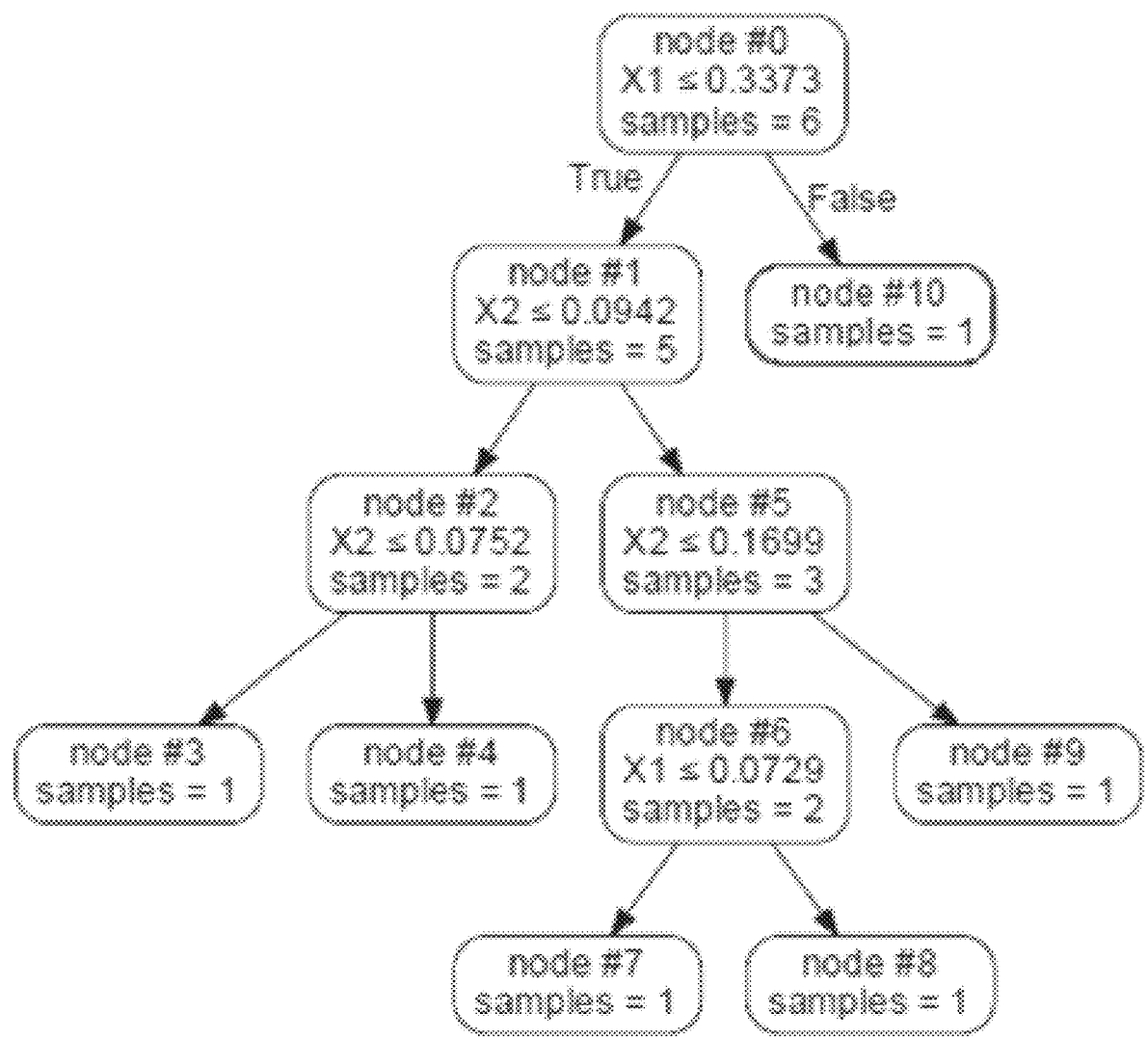

FIG. 2 illustrates an example of an isolation tree application. This relates to embodiments of the present invention wherein the unsupervised anomaly detection algorithm comprises iForest, preferably concerns iForest. The base learning algorithm of iForest is called isolation tree (iTree), which constructs a proper binary tree in a completely random manner based on a subsample of size $\psi$, with $\psi$ a natural number, taken from the training data without replacement (proposed default value: $\psi=256$). In a divide-and-conquer fashion, iTree recursively splits the space into progressively smaller, axis-parallel rectangles with the aim to isolate instances. Ideally, there remains only one instance in each leaf node. Given their properties, anomalies are thereby more susceptible to isolation, and therefore tend to be closer to the root of an iTree than normal instances. This is illustrated by FIG. 2. FIG. 2a shows a two-dimensional graph with 6 samples, each associated with different values for the continuous numeric attributes $X_1$ and $X_2$. An iTree node is created by randomly selecting an attribute along with a randomly drawn split value, which lies between the minimum and maximum of the selected attribute. In this example, the first randomly selected attribute is $X_1$, and the first randomly drawn up split value is a. This results in the vertical line in FIG. 2a, corresponding two the split at iTree node #0, as displayed on FIG. 2b. This procedure of selecting an attribute and determining a split value is repeated until some stopping condition is reached, such as the number of samples in each leaf node equaling 1. Overall, the anomaly (indicated with triangle on FIG. 2a) falls into the leaf node directly under the root, and thus is separated (isolated) faster than the normal data points (indicated with circles on FIG. 2a). Note that the application of iTrees is only meaningful on numeric attributes. When a test instance passes through an iTree, at each non-leaf node, the respective attribute value is retrieved and tested against the split value in order to decide its traversal to either the left or right child node.

Example 3: Example Anomaly Score Definition with iForest

As Example 2, also this example relates to embodiments of the present invention wherein the unsupervised anomaly detection algorithm comprises iForest, preferably concerns iForest, with the use of iTrees preferably according to Example 2. To determine an anomaly score for a given vector instance x with d scalar real values, (i.e. d different attributes representing the number of attribute measurements, iForest solely leverages the learned tree structures of the T iTrees, with T a natural number. Since anomalies are more susceptible to isolation, an anomalous instance is expected to have a shorter path length than a normal instance when it traverses an iTree from root to leaf. Given an isolation tree $h_t$, the path length $h_t(x)$ for instance x, with $h_t(x)$ a positive real number, is derived by counting the number of edges e from the root to the leaf node x falls into. To account for the possibility that the isolation of a set of instances at the leaf node did not fully succeeded, the following adjustment is added to e as a function of the leaf node size n (see Liu et al. (2012)):

$$c(n) = \begin{cases} 2H(n-1) - 2(n-1)/n & \text{if } n > 2, \\ 1 & \text{if } n = 2, \\ 0 & \text{otherwise,} \end{cases} \quad (1)$$

where H(·) is the harmonic number that can be approximated by H(a)≈ln(a)+0.5772156649 (Euler's constant). Since an iTree is structurally equivalent to a Binary Search Tree (BST), the adjustment is derived from unsuccessful searches in BST and aims to account for the average path length of a random sub-tree that could be built given the leaf node size (Liu et al., 2008, 2012). The average path length of instance x can be computed by utilizing the collection of T constructed iTrees:

$$E(h(x)) = \frac{1}{T}\sum_{t=1}^{T} h_t(x), \quad (2)$$

where $h_t(x)=e+c(n)$ is the path length of x derived from the $t^{th}$ isolation tree. Liu et al. (2008, 2012) empirically showed that already at a moderate ensemble size (proposed default value: T=100), the average path length stabilizes quickly and tends to be much lower for anomalous instances.

Finally, the anomaly score s, with s a real number, for instance x, can be computed as follows (Liu et al., 2008, 2012):

$$s(x, \psi) = 2^{-\frac{E(h(x))}{c(\psi)}},$$

where E(h(x)) is defined as in (2) and c(ψ) serves as a normalization factor to make a suitable comparison of models with different subsample sizes. The latter is regarded to be the average path length of traversing a random tree that was constructed based on a sample of size, see "Zhou, Z.-H. (2012); Ensemble Methods: Foundations and Algorithms (1st ed.); CRC press".

The final mapping step in (3) ensures that the anomaly score lies in the interval (0, 1]. In a preferred embodiment, however, anomaly scores are computed as follows:

$$s_{skol}(x, \psi) = s(x, \psi) - 0.5 = 2^{-\frac{E(h(x))}{c(\psi)}} - 0.5.$$

Consequently, the anomaly scores are centered around zero with interval [−0.5, 0.5]. Hence, an instance with a score close to the upper bound is regarded as an anomaly.

Example 4: Example Size/Weight Measurements

In this example, the system for detecting anomalies is applied to a specific example with size/weight measurements. These are intuitive attributes that are typically found in a life insurance data set. Important factors for life insurance organizations to determine the rate class are height, weight, and gender of a person. Fortunately, research literature provides parameter estimates for data distributions, making the creation of artificial values of these three attributes straightforward. More specifically, a representative sample from accurate bivariate distributions for height and weight of men and women in the US is generated, where distribution parameters were inferred from a large population survey. Clearly, in this example, it is assumed that these three attributes are meaningful to users in the context of a life insurance business application.

Figure 3A:
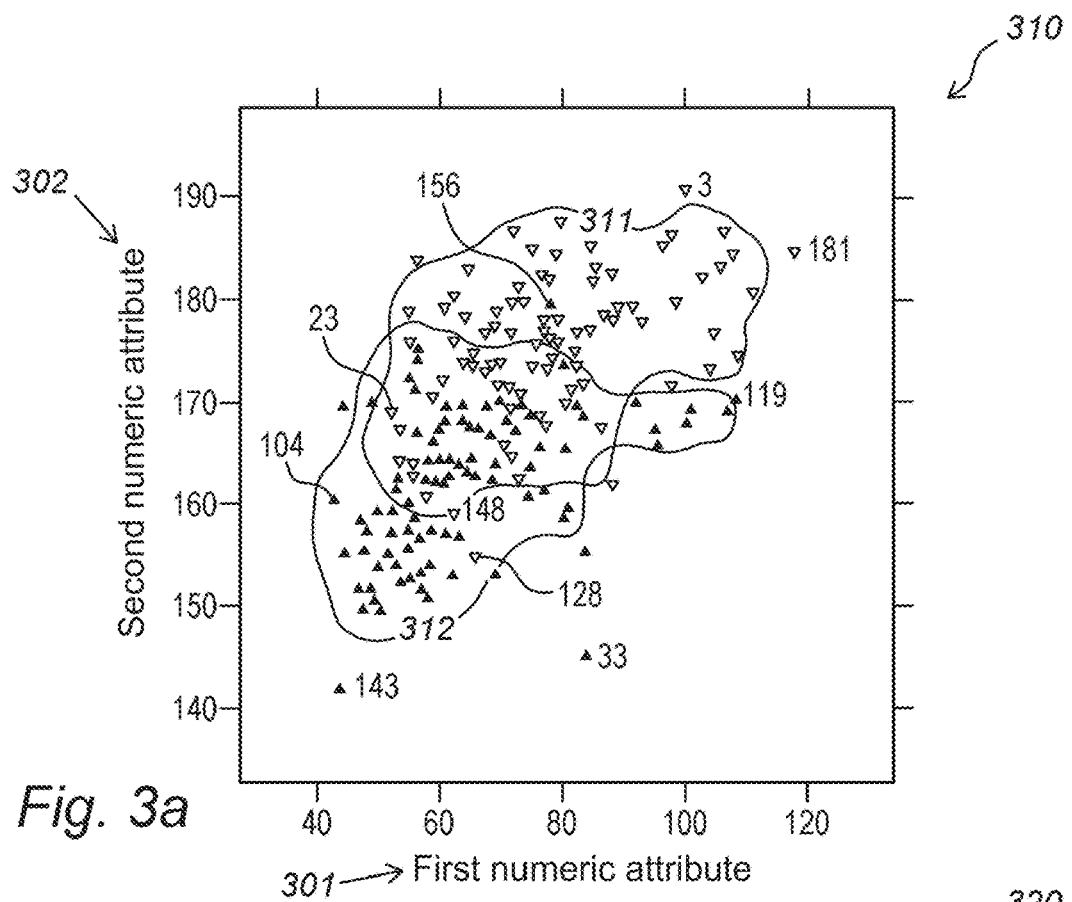
FIGS. 3a to 3d show a comparison of anomaly detection according to prior art methods and according to the present invention for a specific example, where
Figure 3B:
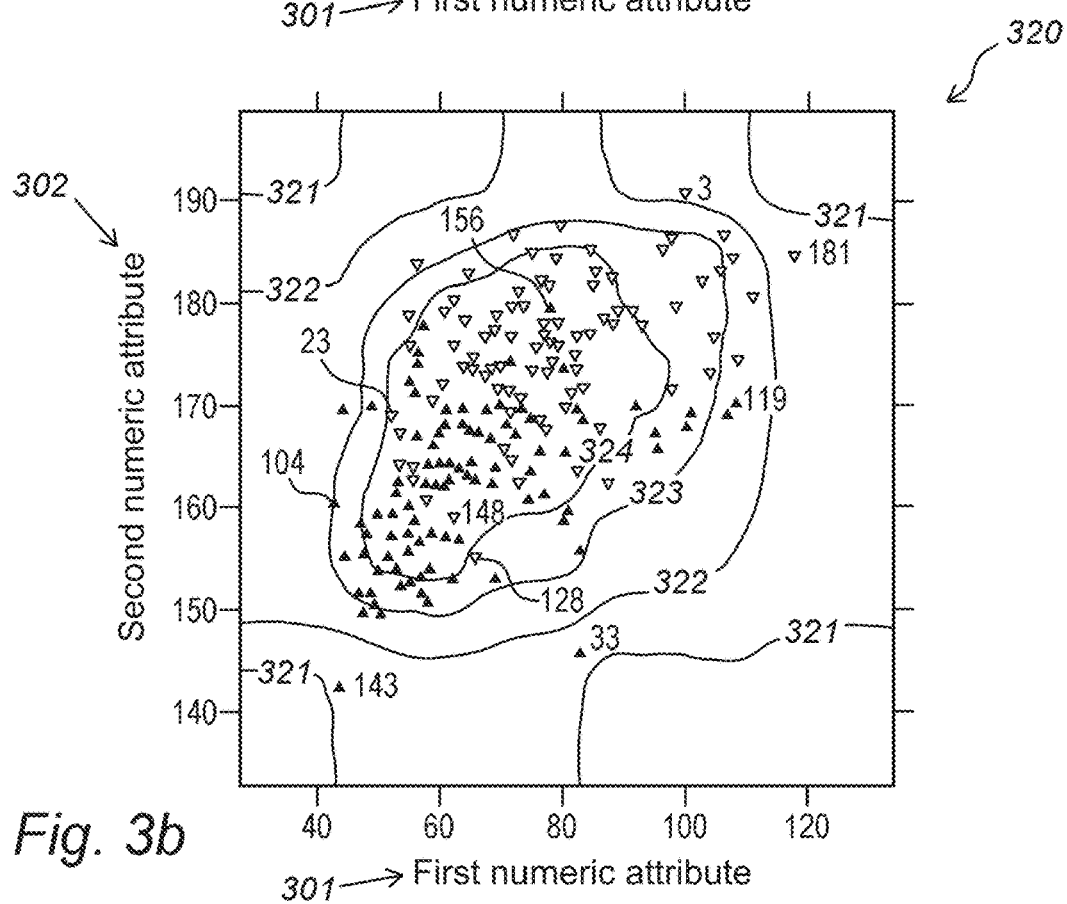
Figure 3C:
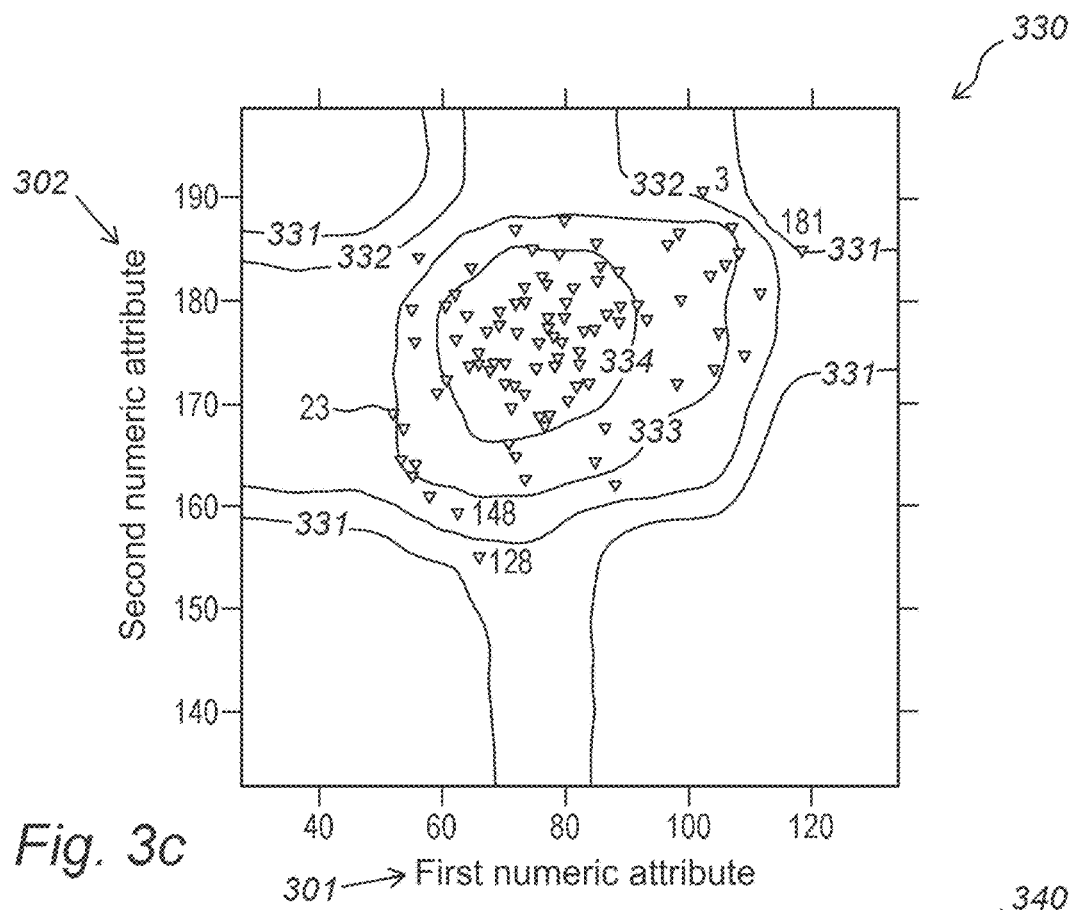
Figure 3D:
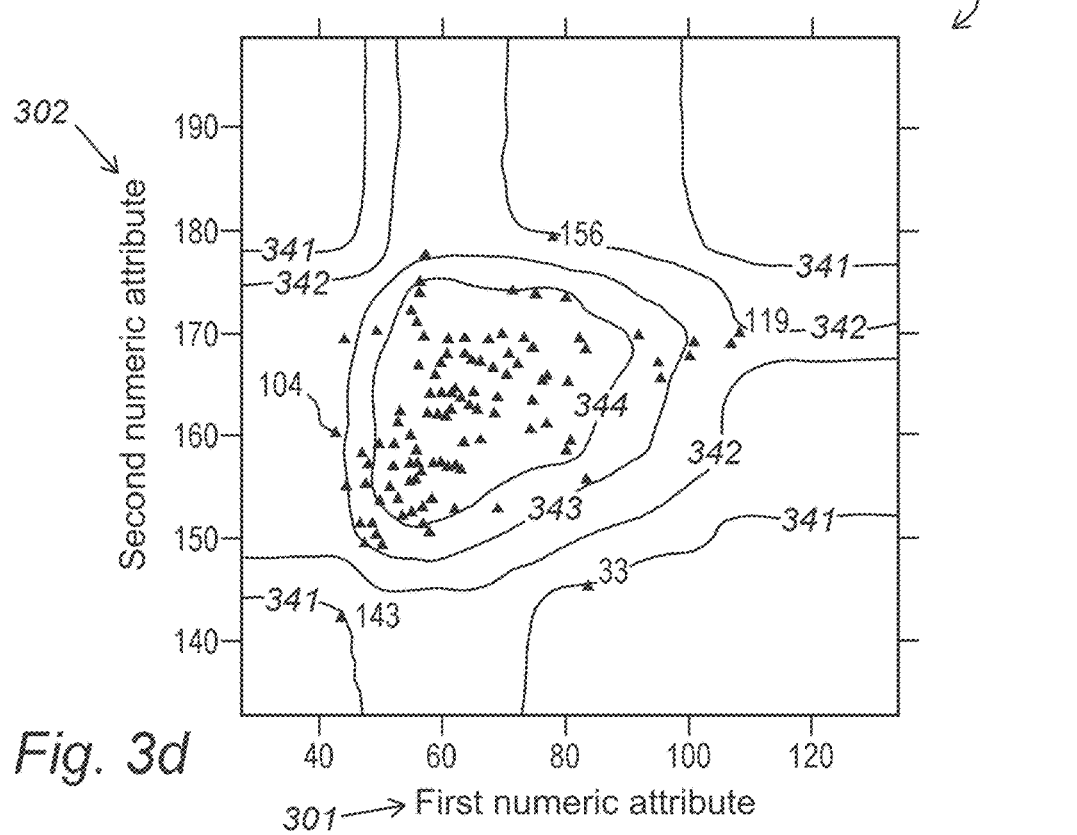

Plotting the data reveals that the data distributions of male and female heavily overlap. This is displayed in FIG. 3a in a two-dimensional graph (310), where the first numeric attribute (301) (attribute index 2) represents the weight (in kg) and the second numeric attribute (302) (attribute index 3) the height (in cm). The nominal attribute (attribute index 1) concerns the gender. Data points corresponding to females are represented with upward-pointing triangles, of which five are labelled (33, 104, 119, 143, 156). Likewise, data points corresponding to males are represented with downward-pointing triangles, of which five are labelled (3, 23, 128, 148, 181). Contour lines 311 and 312 are indicative of the clustering of data points for males and females, respectively. Individual data points may be appreciated as anomalies from visual inspection of the graph 310. For example, observation 156 (128) is the tallest woman (the shortest man), and may be considered as an interesting peculiarity to the user, yet when data are viewed in their entirety, this observation does not strike as a peculiarity since it is concealed by the data of the other gender. This is also evident in the anomaly scores produced by a system according to the state of the art with the iForest trained in the conventional way, meaning that nominal attributes are discarded and no particular data partitioning is performed in the anomaly detection exercise. This is shown in FIG. 3b, where the contour lines 321-324 join points of equal anomaly score, in descending order of anomaly score value. However, in settings such as for instance insurance fraud, one desires to also include information of nominal attributes in a meaningful way with the aim to further improve the detection performance and present anomalies to users that might be more interesting to them. In particular, the present invention enables users to detect hidden anomalies leveraging information of the nominal gender attribute. To enable the detection of such instances, the steps selection, partitioning and anomaly detection of the approach discussed in Example 1 are carried out with $S_{nom}=\{1\}$ and $S_{num}=\{2, 3\}$, where $S_{nom}$ denotes the set of attribute indices referring to selected nominal attributes, and $S_{num}$ denotes the set of attribute indices referring to selected numeric attributes. Hence, there is only one relevant set of partition-specifying values, denoted $V_1=\{\text{female, male}\}$. The Cartesian product resulting from all combinations of nominal attributes, denoted K, is a set of two 1-tuples: K={(female), (male)}, which results in two data partitions split according to female and male with |D(female)|=104 and |D(male)|=96, whereby D(female) (D(male)) refers to the partition of the data set conditioned on females (males), and |D(·)| denotes the number of records in the given partition. Next, conditional anomaly detection is performed by training an iForest on each data partition and examining the anomaly scores. Evidently, the emerged pattern deviates from the previous analysis, which now clearly identifies instance 156 (128) as an outlying observation. This is illustrated, on the one hand, by FIG. 3c, with a separate graph 330 for males, where the contour lines 331-334 join points of equal anomaly score, in descending order of anomaly score value. On the other hand, this is illustrated by FIG. 3d, with a separate graph 340 for females, where the contour lines 341-344 join points of equal anomaly score, in descending order of anomaly score value.

The comparison of the anomaly scores, as well as the resulting ranks, further substantiates that the inclusion of nominal attributes, as in systems according to the present invention, is highly beneficial to detect anomalies which would otherwise remain undetected. This is illustrated by following table.

|   |        |               |                  | Proposed iForest$_{CAD}$ approach | | | |
| i | Gender | iForrest (n = 200) | iForrest$_{ext}$ (n = 200) | iForrest$_{(male)}$ (n = 96) | iForrest$_{(female)}$ (n = 104) | Rank (n = 200) | Hidden anomaly |
|---|--------|---------------|------------------|-------------------|---------------------|---------------|----------------|
| 3   | male   | 0.1310 (4)    | 0.0890 (5)  | 0.0887 (3) |            | (7)  |     |
| 23  | male   | −0.0261 (58)  | 0.0292 (21) | 0.0464 (7) |            | (13) | Yes |
| 33  | female | 0.1478 (2)    | 0.1305 (2)  |            | 0.1408 (2) | (2)  |     |
| 104 | female | 0.0366 (12)   | 0.0151 (28) |            | 0.0068 (12)| (25) |     |
| 119 | female | 0.0414 (11)   | 0.0817 (7)  |            | 0.0893 (4) | (6)  |     |
| 128 | male   | −0.0067 (41)  | 0.0930 (4)  | 0.1179 (1) |            | (3)  | Yes |
| 143 | female | 0.1786 (1)    | 0.1511 (1)  |            | 0.1564 (1) | (1)  |     |
| 148 | male   | −0.0630 (101) | 0.0383 (16) | 0.0627 (4) |            | (8)  | Yes |
| 156 | female | −0.0709 (120) | 0.0833 (6)  |            | 0.0975 (3) | (5)  | Yes |
| 181 | male   | 0.1318 (3)    | 0.1181 (3)  | 0.1075 (2) |            | (4)  |     |

For example, observation 156 (128) has an anomaly score of −0.0709 (−0.0067) and receives a rank of 120 (41) in the conventional approach. Thus, this observation would likely be regarded as normal rather than anomalous. On the other hand, the proposed approach (anomaly scores in the fifth and sixth column, with label iForest$_{CAD}$) shows strong indication that this observation is anomalous and moves its rank from 120 (41) upwards to 5 (3). This discrepancy in scores and ranks evidently demonstrates that such hidden anomalies would have likely remained undetected with the conventional approach. Yet, it is also important to note that anomaly scores and ranks of the global anomalies stay more or less unchanged, see, for instance, observation 3 (the tallest man) and 143 (the shortest woman). Despite performing a conditional anomaly detection, example system according to the present invention continues to coherently reflect global anomalies, therefore one may argue that the system extends the detection capabilities of the regular iForest.

Figure 4:
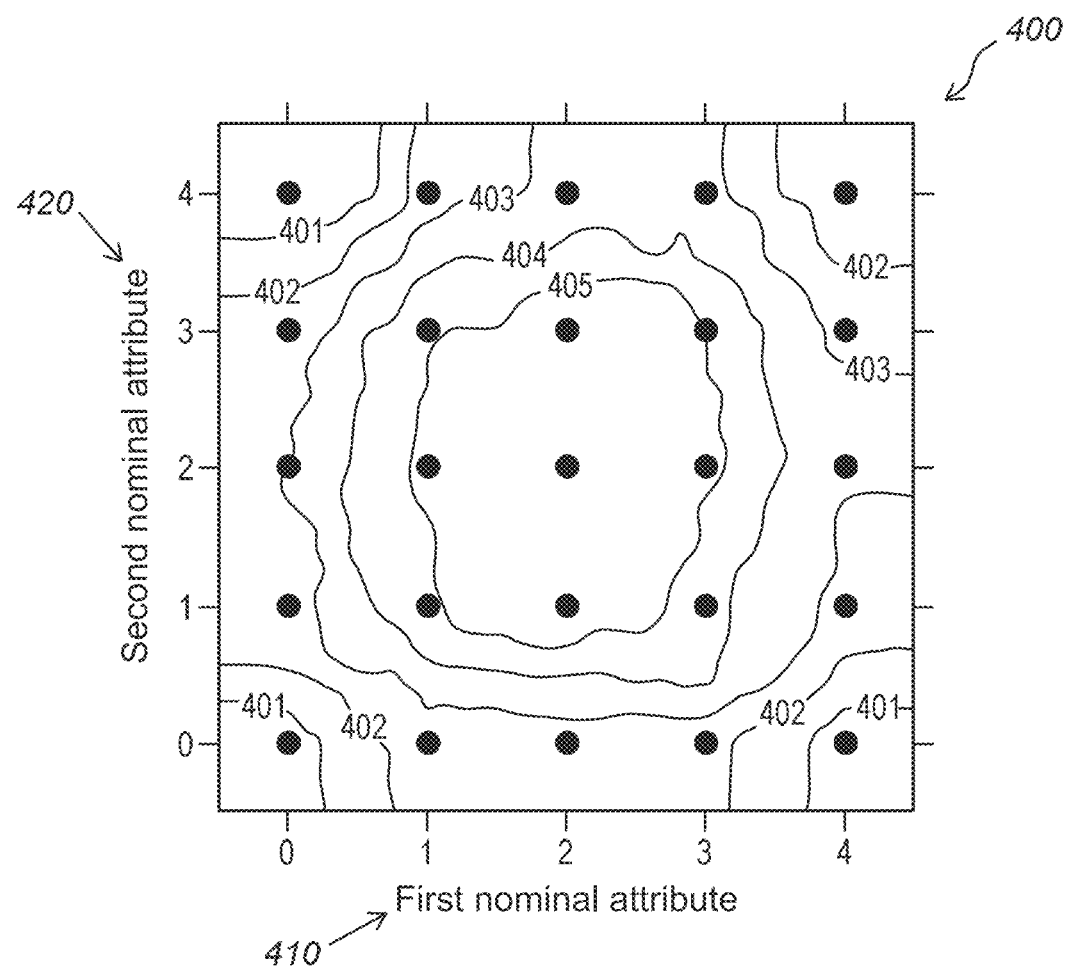
FIG. 4 shows a specific example with arbitrary mapping of values of two nominal attributes.

An alternative approach to incorporate nominal attributes into the anomaly detection is to establish an arbitrary ordering and map nominal values to numeric ones, as proposed by Sun et al. (2016), referred to as iForest$_{ext}$. Thus, following this approach, the values "female" and "male" in our example may be mapped to the numeric values 0 and 1, respectively. The outcome of this analysis for selected instances is shown in the iForest$_{ext}$ column of the table above. It can be noted that this method assigns more or less similar ranks to most of the selected instances as the iForest$_{CAD}$ approach for this simple example, except for the two hidden anomalies i=23 and i=148 the ranks given by the system according to the present invention are almost twice as large. As such, even a simple example allows to show the significant difference in anomaly detection performance. This is due to fact that the iForest$_{ext}$ method by Sun et al. (2016) for incorporating nominal attributes is inadequate on the conceptional level. Recall that an attribute is chosen randomly at each node in the construction of an iTree. Hence, when considering the current example, the information that data are generated from different distributions is not properly processed since the iTree will make splits that are determined from both male and female data when a numeric attribute is selected. Thus, the extended isolation forest (Sun et al., 2016) lack the directness of the approach according to the present invention, with a strict distinction between nominal values. Due to the separate anomaly detection on nonoverlapping data partitions in a system according to the present invention, anomalies are detected strictly with respect to their own reference group; whereas the iForest$_{ext}$ stochastically jumps across the mapped values of the nominal attribute and thus blurs the relationship to the reference group. Undoubtedly, this has an influence on the construction of iTrees as well as on the anomaly scores. An undesired consequence of such simple nominal-to-numeric mapping is that instances which are assigned the lowest or highest mapped value receive a higher anomaly score merely because of the value arrangement in space. This is illustrated by FIG. 4 by a two-dimensional graph (400) with generic first nominal attribute (410) and generic second nominal attribute (420). Hereby, the contour lines 401-405 join points of equal anomaly score, in descending order of anomaly score value. This is, of course, inadequate on the conceptual level since the mapping from nominal to numeric values is arbitrary. Hence, this results to lower anomaly detection performance when compared to the output of the system according to the present invention.

Example 5: Example Images

In this example, Example 4 is addressed from a different perspective, with a different application. Hereby, the records concern raw uncompressed images taken by e.g. a fixed security camera. The first numeric attribute (attribute index 2) concerns the overall brightness of the image, on a scale of 0 to 255, with 0 corresponding to an all-black image, and 255 corresponding to an all-white image. The second numeric attribute (attribute index 3) concerns the contrast of the image, on a scale of 0 to 255, with 0 corresponding to an image in a single color value (if it concerns color images) or a single intensity value (if it concerns black and white images), and values close to 255 corresponding to the dominant presence of both very dark (near-black) pixels and very light (near-white) pixels. In one example embodiment, the nominal attribute (attribute index 1) concerns the camera with which the image is taken, which may be available in the EXIF information or may be inferred from the file name formatting, and the data set comprises a group of images taken by two different cameras, referred to as Camera A and Camera B.

Furthermore, assume that all images are taken on the same day, in the same period of time, e.g. between 2 and 3 pm. In such a case, the images of a single camera are typically very similar unless an event takes place. Hence, an anomaly may be indicative of an event taken place. However, the images of one camera are typically very different from those taken with another camera due to the different scene depicted. Alternatively, both cameras may be pointed to approximately the same scene but may be different in terms of technical components (e.g. lens), internal processing or in terms of building year.

Adopting the same notation as in Example 4, the steps selection, partitioning and anomaly detection of the approach discussed in Example 1 are carried out with $S_{nom}=\{1\}$ and $S_{num}=\{2, 3\}$. There is only one relevant value set, denoted $V_1=\{$Camera A, Camera B$\}$. The Cartesian product is a set of two 1-tuples: K={(Camera A), (Camera B)}, which results in two data partitions split according to Camera A and Camera B with |D(Camera A)|=104 and |D(Camera B)|=96. Next, conditional anomaly detection is performed by training an iForest on each data partition and examining the anomaly scores as displayed on FIG. 3, with results identical and discussion to those discussed in Example 4. Hereby, in FIG. 3, the first numeric attribute (301) represents the overall brightness (on a scale from 0 to 255), the second numeric attribute (302) the contrast (on a scale from 0 to 255). Data points corresponding to Camera A are represented with upward-pointing triangles, data points corresponding to Camera B are represented with downward-pointing triangles. The detected anomalies are as indicated in Example 4.

Example 6: Example Work Compensation

In this example, the present system, hereafter referred to as "iForest$_{CAD}$ approach" is applied on real-world WC (work compensation) claims received from a large European insurance organization. The aim is to detect for individual such insurance claims whether they are fraudulent. In particular, we describe the incorporation of nominal attributes according to iForest$_{CAD}$ that is meaningful to the special investigation unit (SIU) in order to enhance the detection of fraudulent WC claims. After a general motivation of the context, the specific example is highlighted.

Workers' compensation (WC) insurance provides a cost coverage in case employees sustain a work-related injury or disease that occur as a result of performing their occupational duties. For example, in the USA, coverage may be required for costs such as wage replacement, medical care and rehabilitation, death benefits for the dependents if the employee deceased in work-related accidents (including terrorist attacks), and so on. It is believed that WC is one of the most vulnerable insurance lines to fraud. Insurance fraud is found to occur if (at least) the following elements are presented (see "Viaene, S., & Dedene, G. (2004); Insurance Fraud: Issues and Challenges; The Geneva Papers on Risk and Insurance, 29 (2), 313-333", referred to as Viaene and Dedene (2004) below):

1. Misrepresentation of circumstances or material facts in the form of lie, falsification, or concealment,
2. Deliberate plan to deceive, and
3. Purpose to receive unauthorized benefits.

Viaene and Dedene (2004) further classified insurance fraud into three broad categories:

(1) internal versus external, (2) underwriting versus claim, and (3) soft versus hard.

The first category (internal versus external) attempts to distinguish between the various types of perpetrators. That is, internal fraud is committed from within the insurance organization, e.g., by insurers, agents, insurer employee, and so on, whereas external fraud is perpetrated by individuals outside the organization, e.g., by applicants, policyholders, claimants, etc. The distinction sometimes becomes blurry in situations that involve a collusion between internal and external parties. The second category (underwriting versus claim) aims to address the various types of fraud, where it is particularly important to distinguish between perpetrating fraud at underwriting and at claim time. The former refers, for example, to fraudulent activities at the time of the renewal of the insurance contract or the misrepresentation of information during the application (application fraud) with the aim to attain either coverage or a lower premium (premium fraud). On the other hand, the latter type of insurance fraud is typically more prominent and refers to claim fraud in which claims are deliberately inflated, false, or fictitious. The final category (soft versus hard) aims to provide an indication of the degree of intent by assigning labels to the severity of the committed fraud. Soft fraud, often also referred to as opportunistic fraud, describes the cases in which, for example, the claimant seizes the opportunity to exaggerate the damage of an otherwise legitimate claim (claim padding). In contrast, hard fraud is typically associated with carefully planned and well-executed scams with the purpose to fleece insurance. Clearly, hard fraud refers to well-organized crime executed by cunning individuals with malicious intent or sophisticated fraud rings (e.g., deliberately filing bogus claims).

Information asymmetry is the natural fertilizer for fraud as emphasized by Viaene and Dedene (2004). The party with the information advantage has the upper hand in the business relationship which fraudsters leverage to their advantage to receive a more beneficial business deal. In case of WC, claimants are naturally in an advantageous position when filing the claim to the insurer, since the insurer has often no other option than to trust the provided information filed in the claim. Here, fraud can range, for example, from the exaggeration of a minor injury (i.e., opportunistic fraud) to more severe scenarios such as purposely staging an accident (i.e., hard fraud) to obtain rightless WC benefits.

A risk named "moral hazard," a well-established term in the insurance literature, is often associated with WC insurance that arises from the information asymmetries. Two types of moral hazard are characterized in the literature: ex ante moral hazard and ex post moral hazard. The former, for example, describes the influence of the level of WC benefits on workers' attitude toward safety, since workers are aware that the insurance will compensate for the costs associated with the injury. On the other hand, ex post moral hazard is equivalent to the pre-established fraud definitions. Thus, this term encompasses soft fraud (e.g., exaggerating injury) and hard fraud (e.g., faking injuries, staging accidents, or filing claims for non-work related or prior injuries). One should keep firmly in mind that, unlike other social insurances, WC benefits essentially compensate individuals for not working. Research studies have shown that the number of filed claims will generally increase as benefits increase. Additionally, under certain assumptions, the level of WC benefits has a stronger impact on the probability of reporting a hard-to-diagnose injury (e.g., back-related injuries, sprains, strains, and stress-related problems) than on the probability of reporting a easy-to-diagnose injury (e.g., contusion, fracture, and friction burn). Moreover, economic incentives significantly affect the claim duration. Factors for longer disability may include older age, female gender, and a diagnosis of carpal tunnel syndrome (CTS), or back/neck sprain. They also reported, although with a lower estimated magnitude, that divorced marital status, firm size of fewer than 50 employees, higher county unemployment rates, as well as people working in sectors such as construction and agriculture significantly influences the risk for longer term disability.

Fraudsters consider insurance fraud as a low-risk, high-reward game, since it is far safer than other money earning, serious crimes such as drug trafficking or armed robbery. Additionally, in the USA, the prosecution of insurance fraudsters is less encouraged for reasons such as the lack of specific laws against insurance fraud (in six US states) and jail sentence are typically adjudicated for people convicted of more violent crimes. WC insurance is not less susceptible to fraud than other lines of insurance. Specifically with hard-to-diagnose injuries, insurers have difficulties to verify the true nature of the injury, thus making it easier for fraudsters. Moreover, in WC insurance, a conviction requires hard evidence proving fraudulent behavior "beyond reasonable doubt," but this comes at a high price since much effort and time have to put into the procurement of definitive proof. Fraudsters will constantly try to find ways to outwit the system in order to receive unauthorized WC benefits. Once, they are in the position of receiving benefits, they likely attempt to unduly prolong the period compensated by WC. Advances in analytical technology will thereby continue to play an essential role in the fight against fraud.

The data set consists of 9,572 real-world WC insurance claims from 2011 to 2015 with 23 predictor attributes and a binary response variable indicating whether or not a claim is fraudulent. Due to confidentiality reasons, only three attributes are discussed that one would expect to find in a data set given the nature of the insurance, i.e., type of injury the claimant sustained from the work accident (X1), industry sector of the policyholder (X2), and the duration of incapacity registered in the WC system (X3). The former two are nominal attributes, where X1 has values such as fraction, concussion, and so on, and X2 exhibits values such as construction, manufacturing, etc. The latter attribute, X3, is a numeric measure for the time period the claimant is declared to be incapable of resuming work (i.e., the estimated time required to recovery from the injury registered in the WC system). This is the time period in which the claimant receives WC benefits.

Discussions with the SIU revealed the challenging nature of proving a WC claim fraudulent. Definitive proof is required in order to prosecute fraudster in lengthy court proceedings. Hence, the SIU can only in a few number of cases be absolutely certain that a claim is fraudulent. Of course, the insurance company is highly interested in detecting and preventing fraud as early as possible. For this reason, claims with a high suspicion to be fraudulent have been assigned a fraud label by the SIU. Yet, the target variable Y still remains highly unbalanced. On top of this, the sheer amount of claims filed in a given time period makes it very challenging for the SIU to check each claim. One may be fairly certain that the assignment of fraud labels is nearly flawless, but this is not necessarily true for the assignment of non-fraud labels. In other words, it is possible that there is a number of claims in which fraudsters managed to stay undetected, and thus incorrect labels are assigned to those claims. We refer to this situation as noise in the fraud labels, which can similarly be observed in other lines of insurance as well.

In the following, the steps of selecting, partitioning and anomaly detection of the proposed $iForest_{CAD}$ approach in order to motivate the choices made under the guidance of expert knowledge. The accumulated knowledge of the private investigators (PIs) strongly suggests that the recovery time (i.e., X3) is often a good indicator, in combination with other information, for suspicious behavior. In particular, it is believed that people working in some sectors are more inclined to perpetrate fraud than in others, as well as fraudsters unduly prolong the recovery period in which they receive WC benefits. Hence, the task given to the system according to the present invention is the following: Identify the WC claims that exhibit an abnormal recovery time given the injury type and sector in which the claimant performs his or her occupational duties. This task can be broken down in several subtasks:

Determine whether a given recovery time is anomalous without the need for human judgment.

Take thereby into account the type of injury since some injuries require a longer recovery time than others.

Adjust for the injury type prevalence across the various sectors.

The present invention enables to successfully fulfill this task. More specifically, the subsequent steps of iForest$_{CAD}$ approach are carried out with $S_{nom}=\{1, 2\}$ and $S_{num}=\{3\}$ to perform conditional anomaly detection. In this way, it is determined in a data-driven manner whether a claim possesses an anomalous duration of incapacity given its reference groups (e.g., all claimants that reported a fraction and work in construction). Note that, under the guidance of expert knowledge, values of the nominal attributes, X1 and X2, are regrouped, such that the number of instances in each distinct combination is approximately equal to the sub-sample size, i.e., $|D_k| \approx \psi$ for all k in K, with $\psi=256$.

There are two straightforward ways how the anomaly scores can be incorporated into the fraud detection. The first way involves the removal of the selected attributes and the appending of the anomaly scores. The second way is to augment the data set with the anomaly scores without removing any attributes. Both options were examined and no considerable difference was found in detection performance measured in terms of the area under the ROC curve (AUC). Hence, the first option is chosen to incorporate into the iForest$_{CAD}$ approach since it showed a higher appreciation among the PIs and seems to allow for an easier communication. This is mainly due to dimensionality reduction benefit, which requires to explain less numbers of attributes to the PIs. Additionally, what is important from a practical viewpoint, the dimensionality reduction speeds up the training time of all classification models.

In this example, we further consider the following common binary classification methods: logistic regression, decision tree (CART), random forest, SVM with linear kernel, and SVM with radial basis function (RBF) kernel. Data preparations are tailored to the specific classifier. That is, attributes are processed appropriately for machine learning methods such as SVM, which require standardized input (i.e., attributes with zero mean and unit variance). Weights inversely proportional to the class frequencies in the input data are assigned to address the class imbalance problem, as it can be activated for each classifier. Detection performance is measured by means of the AUC resulting from the stratified 10-fold cross-validation (CV) procedure. We made sure that the performances are evaluated on the exact same resamples for all classification models. For classifiers like the SVMs that require hyperparameter tuning, the stratified 10-fold CV procedure in combination with grid search is applied to find the optimal hyperparameter values according to the AUC criterion.

Out of 20, 16 of the AUC values are at the level of 80% or above (see table below).

(italic) number indicates the best (second best) performance within a condition.

There is a tendency that the black box models (i.e., random forest, linear SVM, and RBF SVM) possess a higher predictive power, yet the difference to the white box logistic model is marginal in each condition. For the given fraud data set, there is no clear indication that applying weighting helps to cope with the class imbalance. The largest AUC performance improvement when applying weighting is observed for the RBF SVM, but the differences in means are well within one standard deviation. A clear pattern emerges when classifiers are trained with different attribute sets (marked as (1) and (2) in the above table), where the difference between attribute set (1) and (2) is that the latter contains the conditional anomaly score attribute produced according to the proposed iForest$_{CAD}$ approach. When trained with set (1), the AUC performance is higher within the classifiers compared to when trained with attribute set (2). For the latter, the metric attribute holding the iForest$_{CAD}$ anomaly scores is identified to have the highest discriminative power according to all classifiers that inherently provide indication for variable importance.

The AUC values presented in the table above are relatively high for most classifiers, indicating a good detection performance of fraudulent WC claims. However, mere AUC performance should not be the only evaluation criterion to assess the fraud detection approach. Other evaluation criteria are, for example, the ease of interpretation and the acceptance of the modeling approach by stakeholders. These criteria are less straightforward to numerically quantify.

Close collaboration with the insurer's SIU showed that the proposed iForest$_{CAD}$ approach finds a higher appreciation among the PIs. That is mainly because of the core idea of detecting anomalous behavior within reference groups that are meaningful and interesting to them. The iForest$_{CAD}$ approach was ultimately validated in a practical setting by using the elected classifier to predict fraudulent WC claims. The predictions were in turn evaluated by the PIs to assess the quality of the fraud leads. No detailed information can be revealed about the exact performance, but a large proportion of previously undetected, suspicious claims were identified. Additionally, the study outcome confirmed that the fraud labels are indeed noisy (as mentioned in subsection on Workers' Compensation Insurance Claim Data). That is, some WC claims managed to stay undetected and thus were assigned the incorrect label of non-fraud.

| Classifier | (1) Without iForest$_{CAD}$ anomaly scores | | (2) With iForest$_{CAD}$ anomaly scores | |
| --- | --- | --- | --- | --- |
|  | Without weights | With weights | Without weights | With weights |
| Logistic | *0.8766* (0.0675) | 0.8612 (0.0698) | *0.8068* (0.0597) | 0.8030 (0.0571) |
| CART | 0.7569 (0.1227) | 0.8019 (0.1076) | 0.7237 (0.0699) | 0.6305 (0.1285) |
| Random forest | 0.8705 (0.0695) | 0.8725 (0.0564) | 0.8027 (0.0640) | *0.8100* (0.0475) |
| Linear SVM | 0.8772 (0.0674) | 0.8584 (0.0706) | 0.8075 (0.0575) | 0.8038 (0.0572) |
| RBF SVM | 0.8375 (0.0689) | *0.8721* (0.0611) | 0.7798 (0.0522) | 0.8174 (0.0526) |

Two sets of attributes are used to train the classifiers: (1) (in circle) corresponds to the set in which no attribute transformation is performed according to the proposed iForest$_{CAD}$ approach; whereas (2) (in circle) corresponds to the set in which it is performed. Weighting is used to cope with the class imbalance problem, where weights are inversely proportional to the class frequencies in the input data. A bold To relate back to the results in the above table, an explanation of the lower AUC performance of the proposed iForest$_{CAD}$ approach is likely due to the different ranking.

Note that the statistical interpretation of the AUC is as follows: "the AUC of a classifier is equivalent to the probability that the classifier will rank a randomly chosen positive instance higher than a randomly chosen negative instance." In this example, a positive instance is a WC claim with a fraud label. The cornerstone of the iForest$_{CAD}$ approach is the creation of a new attribute that assigns more granular anomaly scores to instances which consequently affects the inner construction mechanisms of the classifiers. As demonstrated in Example 4, observations marked as hidden anomalies have very different anomaly scores. When taken the iForest$_{CAD}$ anomaly scores as input and keeping the noise in the fraud labels in mind, it is likely that more claims with a non-fraud label, but are intrinsically suspicious or anomalous, are ranked higher by the classifier. As a result, the classification performance receives a lower AUC value since for those claims the incorrect label is currently assigned. However, as confirmed by the SIU, the practical application of iForest$_{CAD}$ exhibits a high detection performance of suspicious claims that previously remained undetected, which contributes to the merits of the present invention. Recall that iForest is an unsupervised anomaly detection algorithm, meaning that it does not require label information for model construction. The proposed iForest$_{CAD}$ approach in this example has thus a build-in unsupervised component combined with powerful supervised classification techniques. The combination of both supervised and unsupervised learning concepts provides an explanation for the high fraud detection rate when the proposed approach was put into practice.

Example 7: Example of Operational System According to the Present Invention

Figure 5:
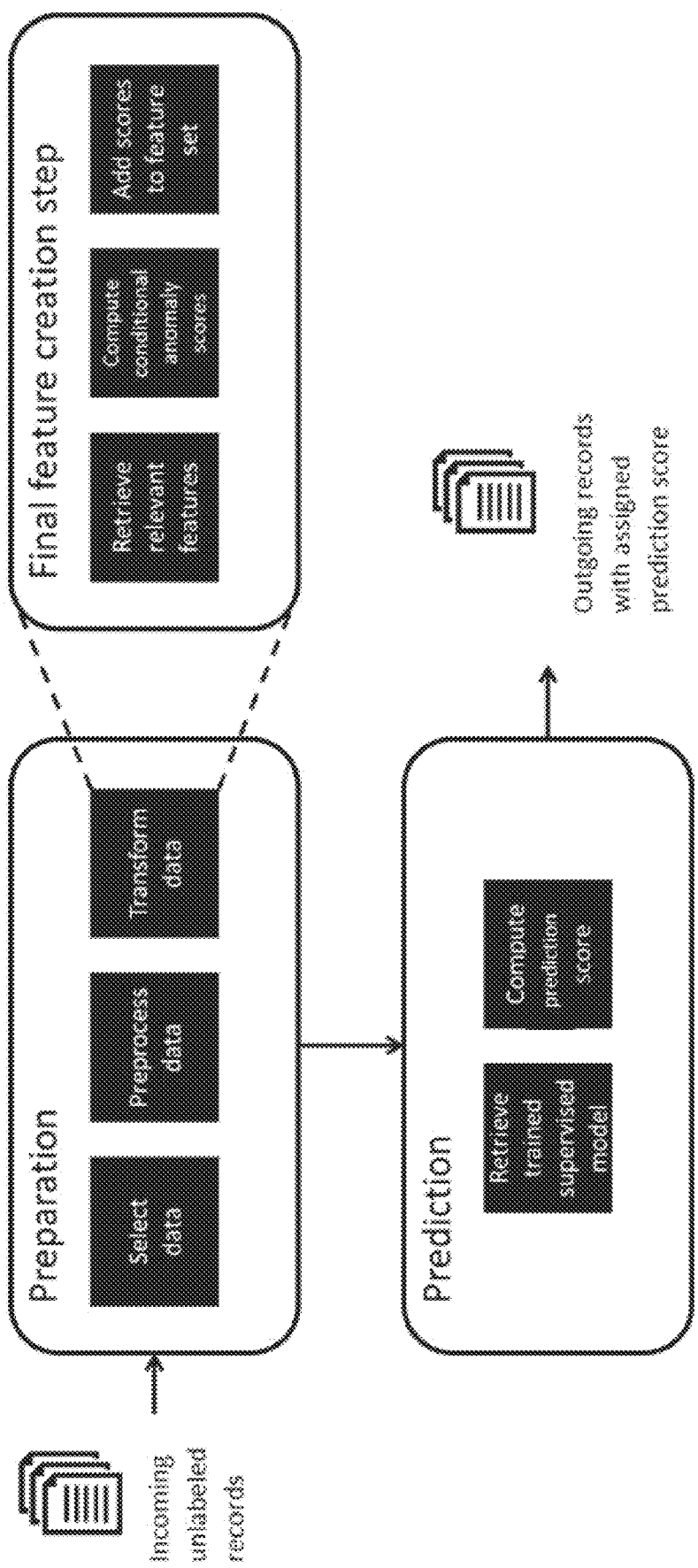
FIG. 5 illustrates the workflow in an example embodiment of the present invention.

This example is illustrated in FIG. 5, illustrating the workflow in an example embodiment of the operational system according to the present invention, whereby the records concern insurance claims, and the anomaly-related criterion concerns whether a claim is fraudulent. The operational system selects those attributes that are required to construct the features used to build the models. Then, the necessary data preprocessing step is performed. For example, if a date variable contains two different formats such as "dd/mm/yyyy" and "yyyy-mm-dd", make sure the format is consistent for all observations. Subsequently, data is transformed to construct features required for making predictions. Concretely, this entails:

selecting the same attributes as in the selection step of the system according to the present invention;
determining the partitions;
retrieving the corresponding trained unsupervised anomaly detection model to compute the conditional anomaly scores;
as in the training phase of the system according to the present invention, updating the records by removing the selected attributes and adding the conditional anomaly scores as attribute to the data set.

Next, the trained supervised classification model is retrieved. Finally, each incoming label, e.g. an insurance claim, is scored with the help of the classification model.

The prediction score, in this context also the fraud score, is a value between zero and one. It allows to rank the insurance claims according to their propensity to be fraudulent (as estimated by the model). For example, an insurance claim with a high fraud score (say, close to one) is more likely to be fraudulent than a claim with a low fraud score (say, close to zero). In this way, the interesting claims can be 'filtered out' from typically tens of thousands of insurance claims which is helpful to steer the investigation efforts toward the fraud cases, and thus making fraud detection more effective.

The invention claimed is:

1. A computer-implemented method for detecting anomalies with respect to a database comprising a plurality of physical entity records of insurance claims, the physical entity records comprising physical data values for at least one numeric attribute and partition- specifying values for one or more nominal attributes from one or more insurance claim records;
the method comprising the steps of:
  (a) retrieving the plurality of physical entity records from the database and preparing the plurality of physical entity records for partitioning;
  (b) partitioning the plurality of physical entity records by associating a partition with each distinct combination of partition-specifying values present in the plurality of physical entity records and grouping the physical entity records according to the partitions;
  (c) for each of the partitions obtained in the step (b), training an unsupervised anomaly detection algorithm on the physical data values of the physical entity records belonging to the partition, thereby obtaining a trained anomaly detection model for each of the partitions, wherein the unsupervised anomaly detection algorithm is an isolation-based anomaly detection algorithm, the isolation-based anomaly detection algorithm is isolation forest, and the partition- specifying values are values for two nominal attributes;
  (d) for each of the physical entity records belonging to the plurality of physical entity records, calculating an anomaly score by means of the trained anomaly detection model that is associated with the partition to which the physical entity record belongs; and
  (e) updating each of the physical entity records in the database by adding the associated anomaly score calculated in the step (d) and storing each of the trained anomaly detection models for each of the partitions in the database;
wherein the method further comprises:
  (01) receiving a user-provided physical entity record from a user, the user- provided physical entity record comprising the physical data values for at least one numeric attribute and the partition-specifying values for the one or more nominal attributes, wherein the physical data values include the industry sector of policyholders and the injury type of an employee of the policyholders;
  (02) preparing the user-provided physical entity record for scoring by selecting the one or more nominal attributes corresponding to the partition-specifying values from the step (01);
  (03) retrieving the trained anomaly detection model that corresponds to the nominal attributes selected in the step (02) from the database;
  (04) calculating the anomaly score of the user-provided physical entity record by means of the trained anomaly detection model retrieved in the step (03), wherein the anomaly score is a real number based on a path length derived from an isolation tree and a normalization factor;
  (05) determining if the user-provided physical entity record is fraudulent using the anomaly score; and
  (06) generating a visual comparison of anomaly detection with contour lines joining points of equal anomaly score thereby steering investigation efforts for fraud detection.

2. The method of claim 1, wherein the preparing in the step (a) comprises updating the plurality of physical entity records by automatically specifying which of the nominal attributes are used as the partition-specifying values from the step (b) onward.

3. The method of 2, wherein updating the plurality of physical entity records comprises automatically transforming at least the one numeric attribute to a newly created nominal attribute; wherein the transforming relates to associating at least one nominal label to at least one numeric interval; and wherein a specification of which of the nominal attributes are used as the partition-specifying values from the step (b) onward comprises the newly created nominal attribute.

4. The method of claim 1, wherein the database comprises training data relating to a plurality of training-related physical entity records comprised in the plurality of physical entity records, the training data comprising a plurality of labels indicative of whether the training-related physical entity records adhere to a predefined anomaly- relating criterion; and the method further comprises additional steps (f)-(j) after the step (e):
(f) updating each of the physical entity records by adding the anomaly score calculated in the step (d);
(g) retrieving the training data from the database;
(h) based on the training data retrieved in the step (g), training a supervised classification algorithm on the updated physical entity records obtained in the step (f) and obtaining a trained supervised classification model;
(i) for each of the physical entity records belonging to the plurality of physical entity records, calculating a prediction score indicative of an extent to which each physical entity record adheres to the predefined anomaly-relating criterion by means of the trained supervised classification model; and
(j) updating each of the physical entity records in the database by adding the associated prediction score calculated in the step (i) and storing the trained supervised classification model in the database.

5. The method of claim 4, wherein for each of the physical entity records, the updating in the step (f) replaces the partition-specifying values with the anomaly score associated with the physical entity record.

6. The method of claim 4, wherein the supervised classification algorithm trained in the step (h) and applied in the step (i) is a logistic regression, CART decision tree, random forest, SVM with linear kernel, or SVM with radial basis function.

7. The method of claim 4, wherein the training of the supervised classification algorithm in the step (h) comprises splitting the training-related physical entity records and associated training data according to holdout or k-fold cross-validation.

8. The method of claim 4, wherein the database further comprises at least one of the trained supervised classification models, and the method further comprises additional steps (A)-(C) after the step (04):
(A) updating the user-provided physical entity record by adding the associated anomaly score calculated in the step (04);
(B) retrieving the trained supervised classification model that corresponds to one or more nominal attributes selected in the step (02) from the database; and
(C) calculating the prediction score of the user-provided physical entity record by means of the trained supervised classification model retrieved in the step (B).

9. The method of claim 8, wherein the method further comprises comparing the anomaly score calculated in the step (04) or the prediction score calculated in the step (C) to a pre-defined alert value, and generating an alert for an operator when the comparison yields that the pre-defined alert value is matched or is exceeded.

10. The method of claim 1, further comprising repeating the step (01) to the step (05) for another of the user-provided physical entity records, thereby determining a second anomaly score, and ranking the anomaly score and the second anomaly score.

* * * * *